US007146247B2

(12) United States Patent
Kirsch et al.

(10) Patent No.: US 7,146,247 B2
(45) Date of Patent: Dec. 5, 2006

(54) COMPUTERIZED METHOD AND SYSTEM FOR LOADING AND/OR UNLOADING A TRAY USING LASER SCANNING TECHNOLOGY

(75) Inventors: Steve Kirsch, Prairie Village, KS (US); Jerry Blair, Weston, MI (US)

(73) Assignee: Cerner Innovation, Inc., Overland Park, KS (US)

( * ) Notice: Subject to any disclaimer, the term of this patent is extended or adjusted under 35 U.S.C. 154(b) by 52 days.

(21) Appl. No.: 10/997,841

(22) Filed: Nov. 24, 2004

(65) Prior Publication Data

US 2006/0129274 A1 Jun. 15, 2006

(51) Int. Cl.
*G06F 17/00* (2006.01)

(52) U.S. Cl. ...................... 700/236; 700/237; 700/241; 700/242; 700/244

(58) Field of Classification Search ................ 700/242, 700/236, 244, 225, 231; 250/221, 221.1, 250/222.1; 364/479.1, 215
See application file for complete search history.

(56) References Cited

U.S. PATENT DOCUMENTS

| | | | |
|---|---|---|---|
| 4,717,042 A | | 1/1988 | McLaughlin |
| 4,785,969 A | | 11/1988 | McLaughlin |
| 4,953,745 A | | 9/1990 | Rowlett, Jr. |
| 5,014,875 A | | 5/1991 | McLaughlin et al. |
| 5,190,185 A | | 3/1993 | Blechl |
| 5,377,864 A | | 1/1995 | Blechl et al. |
| 5,392,951 A | | 2/1995 | Gardner et al. |
| D357,581 S | | 4/1995 | Rogers et al. |
| 5,405,048 A | | 4/1995 | Rogers et al. |
| 5,409,117 A | | 4/1995 | Meador |
| 5,411,065 A | | 5/1995 | Meador et al. |
| 5,445,294 A | | 8/1995 | Gardner et al. |
| 5,460,294 A | | 10/1995 | Williams |
| 5,480,062 A | | 1/1996 | Rogers et al. |
| 5,520,450 A | | 5/1996 | Colson, Jr. et al. |
| 5,549,141 A | | 8/1996 | Meador et al. |
| 5,641,093 A | | 6/1997 | Dolin et al. |
| 5,661,978 A | | 9/1997 | Holmes et al. |
| 5,716,114 A | | 2/1998 | Holmes et al. |
| 5,745,366 A | | 4/1998 | Higham et al. |
| 5,805,455 A | | 9/1998 | Lipps |
| 5,805,456 A | | 9/1998 | Higham et al. |
| 5,842,976 A | | 12/1998 | Williamson |
| 5,883,806 A | | 3/1999 | Meador et al. |
| 5,905,653 A | * | 5/1999 | Higham et al. ............. 700/244 |

(Continued)

OTHER PUBLICATIONS

Cardinal Health, Pyxis Products, www.pyxis.com/products/index.asp website, published Jun. 3, 2004.

(Continued)

*Primary Examiner*—Gene O. Crawford
*Assistant Examiner*—Timothy Waggoner
(74) *Attorney, Agent, or Firm*—Shook, Hardy & Bacon LLP

(57) ABSTRACT

A method and system for loading a tray, e.g., a multi-compartment tray, with at least one medication, the tray having a light grid over a surface thereof is provided. Further provided is a computerized method and system for delivering medication to at least one individual from a tray, e.g., a multi-compartment tray, having a light grid over a surface thereof. If desired, the tray may further include a scanner over a surface thereof which is capable of scanning an identification code coupled with the medication being loaded and/or removed from the tray.

95 Claims, 22 Drawing Sheets

U.S. PATENT DOCUMENTS

| | | | | |
|---|---|---|---|---|
| 5,927,540 | A | 7/1999 | Godlewski | |
| 5,940,306 | A | 8/1999 | Gardner | |
| 6,011,999 | A | 1/2000 | Holmes | |
| 6,021,392 | A | 2/2000 | Lester | |
| 6,039,467 | A | 3/2000 | Holmes | |
| 6,065,819 | A | 5/2000 | Holmes et al. | |
| 6,068,156 | A * | 5/2000 | Liff et al. | 700/236 |
| 6,109,774 | A | 8/2000 | Holmes | |
| 6,116,461 | A | 9/2000 | Broadfield et al. | |
| 6,151,536 | A | 11/2000 | Arnold et al. | |
| 6,175,954 | B1 * | 1/2001 | Nelson et al. | 717/105 |
| 6,272,394 | B1 | 8/2001 | Lipps | |
| 6,275,152 | B1 * | 8/2001 | Speas et al. | 700/213 |
| 6,338,007 | B1 | 1/2002 | Broadfield et al. | |
| 6,339,732 | B1 | 1/2002 | Phoon et al. | |
| 6,361,263 | B1 | 3/2002 | Dewey et al. | |
| 6,385,505 | B1 | 5/2002 | Lipps | |
| 6,499,270 | B1 | 12/2002 | Peroni et al. | |
| 6,609,047 | B1 | 8/2003 | Lipps | |
| 6,640,159 | B1 | 10/2003 | Holmes et al. | |
| 6,760,643 | B1 | 7/2004 | Lipps | |
| 2001/0002448 | A1 | 10/2001 | Haitin et al. | |
| 2001/0029405 | A1 | 10/2001 | Lipps | |
| 2001/0032025 | A1 | 10/2001 | Lenz et al. | |
| 2002/0095238 | A1 | 7/2002 | Ahlin et al. | |
| 2003/0078693 | A1 | 4/2003 | Chavez et al. | |
| 2004/0004419 | A1 | 1/2004 | Godlewski | |
| 2004/0026442 | A1 | 2/2004 | Hutchinson | |
| 2004/0040975 | A1 | 3/2004 | Hunter et al. | |
| 2004/0111179 | A1 | 6/2004 | Broadfield et al. | |
| 2004/0220697 | A1 | 11/2004 | Chavez et al. | |
| 2004/0225409 | A1 | 11/2004 | Duncan et al. | |

OTHER PUBLICATIONS

Medication Automation, Your total automated medication management system, www.pyxis.com/products/medhome.asp website, published Jun. 3, 2004.

Pyxis MedStation Rx 2000, Advanced profile-based automated medication dispensing system, www.pyxis.com/products/medstationrx2000.asp website, published Jun. 3, 2004.

* cited by examiner

COMPUTERIZED METHOD AND SYSTEM FOR LOADING AND/OR UNLOADING A TRAY USING LASER SCANNING TECHNOLOGY

CROSS-REFERENCE TO RELATED APPLICATIONS

This application is related by subject matter to the invention disclosed in the commonly assigned application U.S. application Ser. No. 10/997,841 entitled "Computerized Method and System for Loading and/or Unloading a Tray Having a Light Grid Over a Surface Thereof", which was filed on even date herewith.

STATEMENT REGARDING FEDERALLY SPONSORED RESEARCH OR DEVELOPMENT

Not applicable.

TECHNICAL FIELD

The present invention relates to the field of computer software. More particularly, the present invention relates to a computerized method and system for loading a tray, e.g., a multi-compartment tray, with at least one medication, the tray having a light grid over a surface thereof. The present invention further relates to a computerized method and system for delivering medication to at least one individual from a tray having a light grid over a surface thereof. If desired, the tray may further include a scanner over a surface thereof which is capable of scanning an identification code coupled with the medication being loaded and/or removed from the tray.

BACKGROUND OF THE INVENTION

The pharmacy process, that is, the process that takes place from the time a physician prescribes a medication for a patient to the time when that patient is administered the medication, involves a number of processing steps. For instance, in an in-patient situation, the prescription is received by the pharmacy, the pharmacy reviews the prescription and appropriately dispenses the medication, an authorized individual either retrieves the medication from the pharmacy or an authorized individual from the pharmacy delivers the medication, typically to a nursing station, and a nurse (or other authorized individual) then delivers the medication to the patient. At each step in the process, the timing, identity, and dosage of the medication being delivered must be matched with the medical records associated with the receiving patient in order to ensure the correct medication is being delivered to the appropriate patient at the appropriate time.

A number of different types of automation are currently available to aid pharmacists, physicians, nurses, and other authorized medication-dispensing personnel in ensuring adequate safety in the pharmacy process. For instance, at the pharmacy level, once a valid prescription has been received from a prescribing physician, many pharmacies utilize some form of centralized dispensing device to fill the prescription. Such centralized dispensing devices are available in many different forms from robotics-driven devices which physically pick up a particular medication from a specified location on a pharmacy shelf and place it into a medication bin, a patient-specific container, or the like, to devices which provide electronic instruction to a human user regarding the location on a pharmacy shelf from which a particular medication may be retrieved. The medications, once retrieved, may be delivered directly from the pharmacist to the patient, as is typically the case when medications are being dispensed from an out-patient pharmacy, or, if the patient is in an in-patient setting, may be delivered to a nurse or nursing station for subsequent delivery to the patient for whom the medication was prescribed.

A second form of automation often utilized in the pharmacy process is a unit-based dispensing cabinet. While these cabinets also come in a variety of forms, the basic premise is that an authorized individual inputs information into the unit and medications, which have been loaded into the cabinet from the pharmacy, are dispensed accordingly. For instance, the cabinet may have stored therein a medication profile for a particular patient such that when the patient's medical record number is input, it automatically dispenses the medication that patient is scheduled to be administered taking into account the time of day, length of time since the last dispensing request was made, and the like. Dispensing may also take a variety of forms ranging from dispensing all necessary medications into a patient-specific bin for the nurse to then remove from the unit and deliver to the patient bedside, to unlocking one or more drawers in which the appropriate medications are located while any drawers containing medications that are not due to be administered to the patient remain locked. The authorized individual may then remove the medication from the unlocked drawer(s), place it in the delivery container of their choice, and deliver it to the patient bedside.

The types of automation hereinabove described can be very expensive for pharmacies and hospitals to purchase and maintain. This is particularly true with regard to unit-based cabinets which are often present at each nursing station throughout a medical facility. Therefore, a system and method which is less expensive to implement and yet still preserves appropriate safety checks in the dispensing process would be desirable. Additionally, a system and method for dispensing medication from a pharmacy and/or delivering medication to a patient which requires fewer processing steps than the prior alternatives would be advantageous.

BRIEF SUMMARY OF THE INVENTION

The present invention provides a method in a computing environment for loading a tray, e.g., a multi-compartment tray, with at least one medication, the tray having a light grid over a surface thereof. The method may include receiving an indicator that at least one medication was loaded into a tray having at least one compartment and determining a particular compartment of the tray into which the medication was loaded. In one aspect, receiving the indicator that the at least one medication was loaded into the tray includes detecting an interruption in the light grid and determining the particular compartment into which the medication was loaded includes determining the location of the interruption and a corresponding location within the tray. If desired, the method may further include receiving an indicator that the tray was received into a tray-receiving component, e.g., a drawer, and generating the light grid over the surface of the tray such that when the light grid is interrupted, the location of the interruption and the corresponding location within the tray are capable of being determined.

In one aspect, the method further includes generating a scanner over the surface of the tray such that when the scanner is interrupted by at least one medication having an identification code coupled therewith that is capable of being scanned, an identity of the at least one medication is capable of being determined.

Additionally, the present invention provides a method in a computing environment for loading a tray, e.g., a multi-compartment tray, with medication from a medication supply container, the medication supply container having a first light grid over the surface thereof and the tray having a second light grid over the surface thereof, the light grids being in communication with one another through a network. The method may include receiving an indicator that a medication was removed from the medication supply container, receiving an indicator that the medication was loaded into a tray having at least one compartment and determining a particular compartment of the tray into which the medication was loaded. In one aspect, receiving the indicator that the medication was removed from the medication supply container includes detecting an interruption in the first light grid, receiving the indicator that the medication was loaded into the tray includes detecting an interruption in the second light grid, and determining the particular compartment of the tray into which the medication was loaded includes determining a location of the interruption and a corresponding location within the tray. If desired, the method may further include receiving an indicator that the tray was received into a tray-receiving component, e.g., a drawer, and generating the light grid over the surface of the tray such that when the light grid is interrupted, the location of the interruption and the corresponding location within the tray are capable of being determined.

In one aspect, the method further includes generating a first scanner over the surface of the medication supply container and a second scanner over the surface of tray, the two scanners being in communication with one another through a network, such that when either scanner is interrupted by at least one medication having an identification code coupled therewith that is capable of being scanned, an identity of the at least one medication is capable of being determined.

The present invention further provides a method in a computing environment for delivering medication to at least one individual from a tray, e.g., a multi-compartment tray, having a light grid over a surface thereof. The method may include receiving an indicator that at least one medication was removed from a tray having at least one compartment and determining a particular compartment of the tray from which the medication was removed. In one aspect, receiving the indicator that the at least one medication was removed from the tray includes detecting an interruption in the light grid and determining the particular compartment from which the medication was removed includes determining the location of the interruption and a corresponding location within the tray. If desired, the method may further include receiving an indicator that the tray was received into a tray-receiving component, e.g., a drawer, and generating the light grid over the surface of the tray such that when the light grid is interrupted, the location of the interruption and the corresponding location within the tray are capable of being determined.

In one aspect, the method further includes generating a scanner over the surface of the tray such that when the scanner is interrupted by at least one medication having an identification code coupled therewith that is capable of being scanned, an identity of the at least one medication is capable of being determined.

Computer systems and computer-readable media having computer-executable instructions for performing the methods disclosed herein are also provided.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms “step” and/or “block” may be used herein to connote different elements of methods employed, the terms should not be interpreted as implying any particular order among or between various steps herein disclosed unless and except when the order of individual steps is explicitly described.

The present invention provides a computerized method and system for loading a tray, e.g., a multi-compartment tray, with at least one medication, the tray having a light grid over a top surface thereof. The present invention further provides a computerized method and system for delivering medication to at least one individual from a tray, e.g., a multi-compartment tray, having a light grid over a top surface thereof. If desired, the tray may further include a scanner over a top surface thereof which is capable of scanning an identification code coupled with the medication being loaded and/or removed therefrom. An exemplary operating environment for the present invention is described below.

Figure 1:
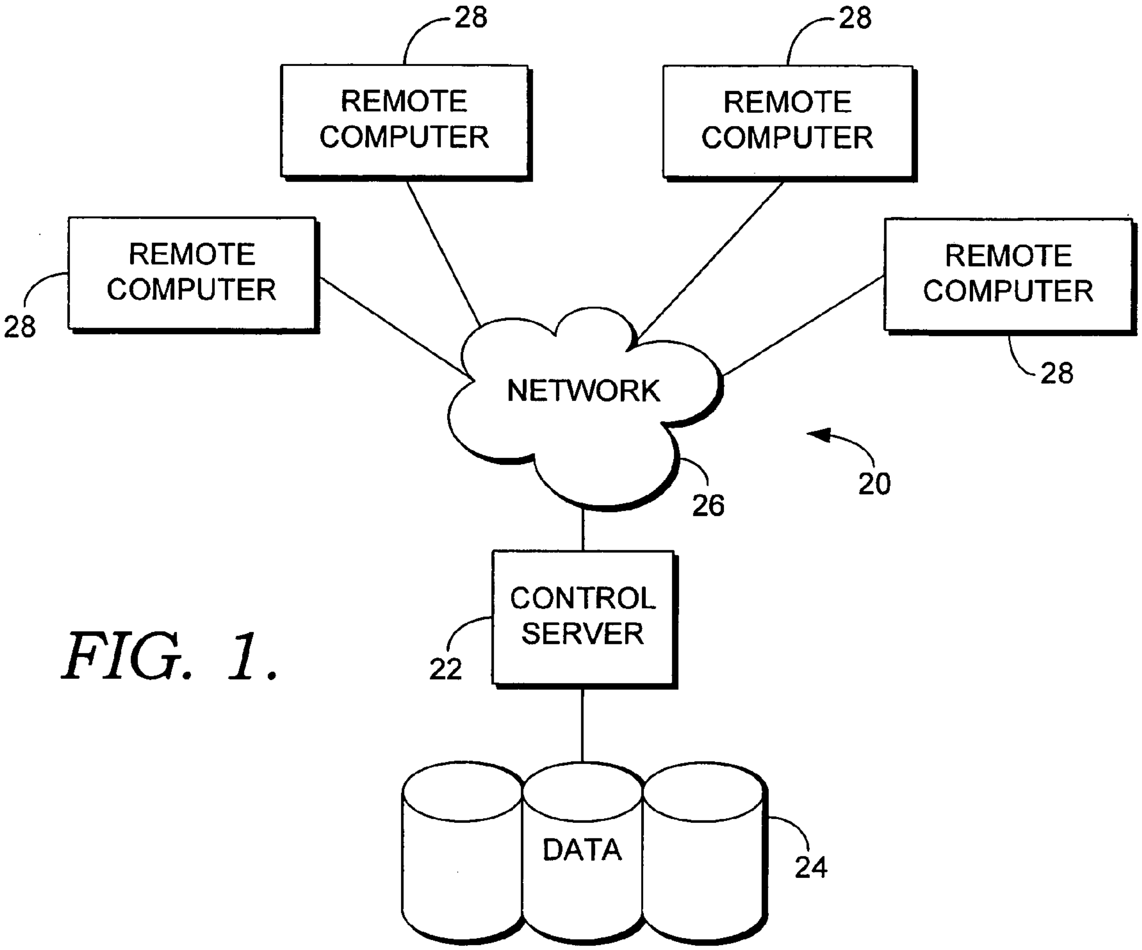
FIG. 1 is a block diagram of a computing system environment suitable for use in implementing the present invention.

Referring to the drawings in general, and initially to FIG. 1 in particular, an exemplary computing system environment, for instance, a medical information computing system, on which the present invention may be implemented is illustrated and designated generally as reference numeral 20. It will be understood and appreciated by those of ordinary skill in the art that the illustrated medical information computing system environment 20 is merely an example of one suitable computing environment and is not intended to suggest any limitation as to the scope of use or functionality of the invention. Neither should the medical information computing system environment 20 be interpreted as having any dependency or requirement relating to any single component or combination of components illustrated therein.

The present invention may be operational with numerous other general purpose or special purpose computing system environments or configurations. Examples of well-known computing systems, environments, and/or configurations that may be suitable for use with the present invention include, by way of example only, personal computers, server computers, hand-held or laptop devices, multiprocessor systems, microprocessor-based systems, set top boxes, programmable consumer electronics, network PCs, minicomputers, mainframe computers, distributed computing environments that include any of the above-mentioned systems or devices, and the like.

The present invention may be described in the general context of computer-executable instructions, such as program modules, being executed by a computer. Generally, program modules include, but are not limited to, routines, programs, objects, components, and data structures that perform particular tasks or implement particular abstract data types. The present invention may also be practiced in distributed computing environments where tasks are performed by remote processing devices that are linked through a communications network. In a distributed computing environment, program modules may be located in local and/or remote computer storage media including, by way of example only, memory storage devices.

With continued reference to FIG. 1, the exemplary medical information computing system environment 20 includes a general purpose computing device in the form of a control server 22. Components of the control server 22 may include, without limitation, a processing unit, internal system memory, and a suitable system bus for coupling various system components, including database cluster 24, with the control server 22. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The control server 22 typically includes therein, or has access to, a variety of computer readable media, for instance, database cluster 24. Computer readable media can be any available media that may be accessed by control server 22, and includes volatile and nonvolatile media, as well as removable and nonremovable media. By way of example, and not limitation, computer readable media may include computer storage media and communication media. Computer storage media may include, without limitation, volatile and nonvolatile media, as well as removable and nonremovable media implemented in any method or technology for storage of information, such as computer readable instructions, data structures, program modules, or other data. In this regard, computer storage media may include, but is not limited to, RAM, ROM, EEPROM, flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by control server 22. Communication media typically embodies computer readable instructions, data structures, program modules, or other data in a modulated data signal, such as a carrier wave or other transport mechanism, and may include any information delivery media. As used herein, the term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer readable media.

The computer storage media discussed above and illustrated in FIG. 1, including database cluster 24, provide storage of computer readable instructions, data structures, program modules, and other data for control server 22.

The control server 22 may operate in a computer network 26 using logical connections to one or more remote computers 28. Remote computers 28 may be located at a variety of locations in a medical environment, for example, but not limited to, clinical laboratories, hospitals and other inpatient settings, ambulatory settings, medical billing and financial offices, hospital administration settings, home health care environments, and clinicians' offices. Clinicians may include, but are not limited to, a treating physician or physicians, specialists such as surgeons, radiologists and cardiologists, emergency medical technicians, physicians' assistants, nurse practitioners, nurses, nurses' aides, pharmacists, dieticians, microbiologists, and the like. Remote computers 28 may also be physically located in non-traditional medical care environments so that the entire health care community may be capable of integration on the network. Remote computers 28 may be personal computers, servers, routers, network PCs, peer devices, other common network nodes, or the like, and may include some or all of the elements described above in relation to the control server 22.

Exemplary computer networks 26 may include, without limitation, local area networks (LANs) and/or wide area networks (WANs). Such networking environments are commonplace in offices, enterprise-wide computer networks, intranets, and the Internet. When utilized in a WAN networking environment, the control server 22 may include a modem or other means for establishing communications over the WAN, such as the Internet. In a networked environment, program modules or portions thereof may be stored in the control server 22, in the database cluster 24, or on any of the remote computers 28. For example, and not by way of limitation, various application programs may reside on the memory associated with any one or more of the remote computers 28. It will be appreciated by those of ordinary skill in the art that the network connections shown are exemplary and other means of establishing a communications link between the computers (e.g., control server 22 and remote computers 28) may be utilized.

In operation, a user may enter commands and information into the control server 22 or convey the commands and information to the control server 22 via one or more of the remote computers 28 through input devices, such as a keyboard, a pointing device (commonly referred to as a mouse), a trackball, or a touch pad. Other input devices may include, without limitation, microphones, satellite dishes, scanners, or the like. The control server 22 and/or remote computers 28 may include other peripheral output devices, such as speakers and a printer.

Although many other internal components of the control server 22 and the remote computers 28 are not shown, those of ordinary skill in the art will appreciate that such components and their interconnection are well known. Accordingly, additional details concerning the internal construction of the control server 22 and the remote computers 28 are not further disclosed herein.

Figure 2:
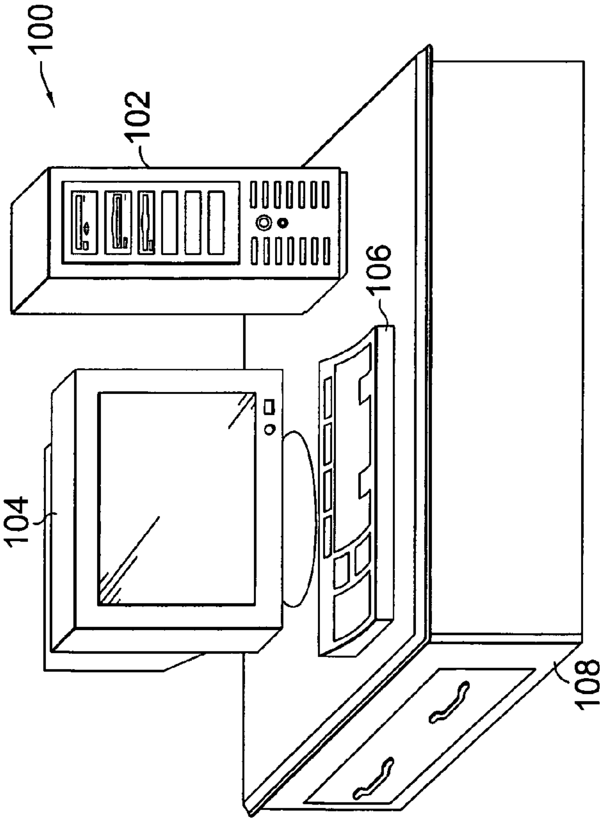
FIG. 2 is a perspective view of a medication loading and delivery unit in accordance with an embodiment of the present invention having a tray-receiving component in a closed position.

As previously mentioned, in one embodiment, the present invention relates to a computerized method and system for loading a tray, e.g., multi-compartment tray, with at least one medication, the tray having a light grid over a top surface thereof. With reference to FIG. 2, an exemplary medication loading and delivery unit for implementing this method of the invention is shown and designated generally as reference numeral 100. It will be understood and appreciated by those of ordinary skill in the art that the medication loading and delivery unit 100 shown is by way of example only and is not intended to limit the scope of the present invention in any way.

The exemplary medication loading and delivery unit 100 of FIG. 2 includes a computing device 102, a display device 104, an input device 106, and a tray-receiving component 108, e.g., a drawer. The computing device 102 may be, by way of example only, a personal computer, server computer, hand-held or laptop device, or the like and is capable of operating in a computer network as hereinabove described with reference to remote computers 28 and network 26 of FIG. 1. The display device 104 and the input device 106 may be of any type known to those of ordinary skill in the art, for instance, the display device 104 may be a monitor and the input device 106 may be a keyboard, trackball, or the like.

Figure 3:
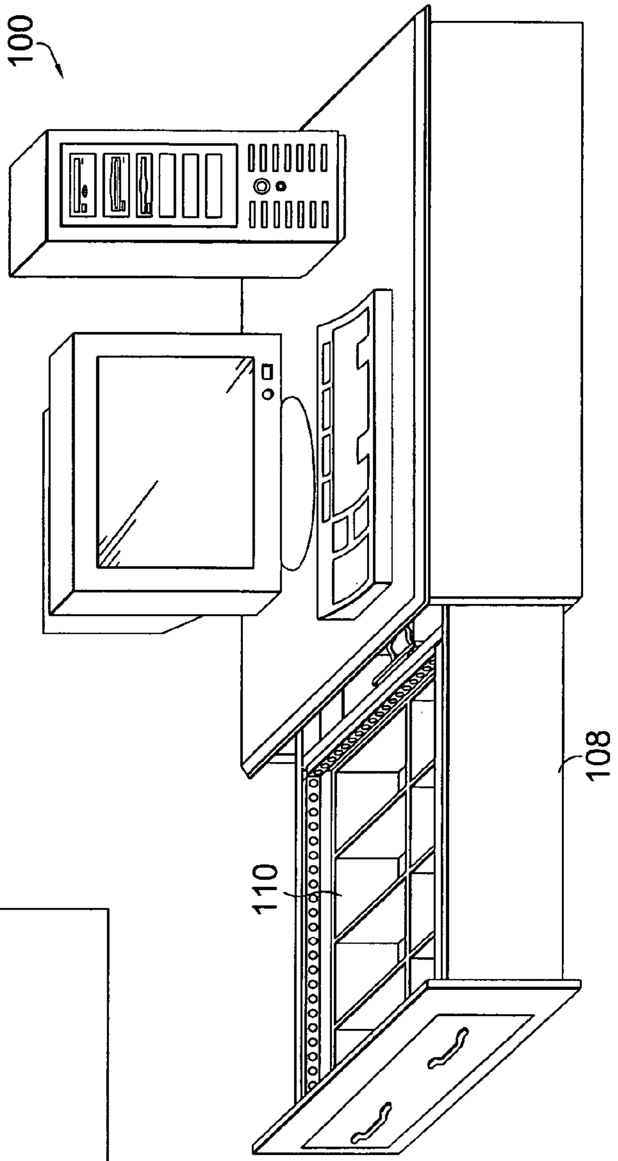
FIG. 3 is a perspective view of the medication loading and delivery unit of FIG. 2 having the tray-receiving component in an open position and a multi-compartment tray received therein in accordance with an embodiment of the present invention.

The tray-receiving component 108 of the exemplary medication loading and delivery unit 100 is capable of receiving a tray, e.g., a multi-compartment tray, into which at least one medication may be loaded and/or removed, as more fully described below. The tray-receiving component 108 of FIG. 2 is shown in a closed position such that the tray is not visible. With reference to FIG. 3, however, the tray-receiving component 108 is shown in an open position with an exemplary multi-compartment tray 110 illustrated as being received therein. The multi-compartment tray 110 of FIG. 3 includes eight compartments of approximately equal size and shape. It will be understood by those of ordinary skill in the art, however, that a tray having any number of compartments in any desired configuration may be utilized and all such variations are contemplated to be within the scope of the present invention.

Figure 4A:
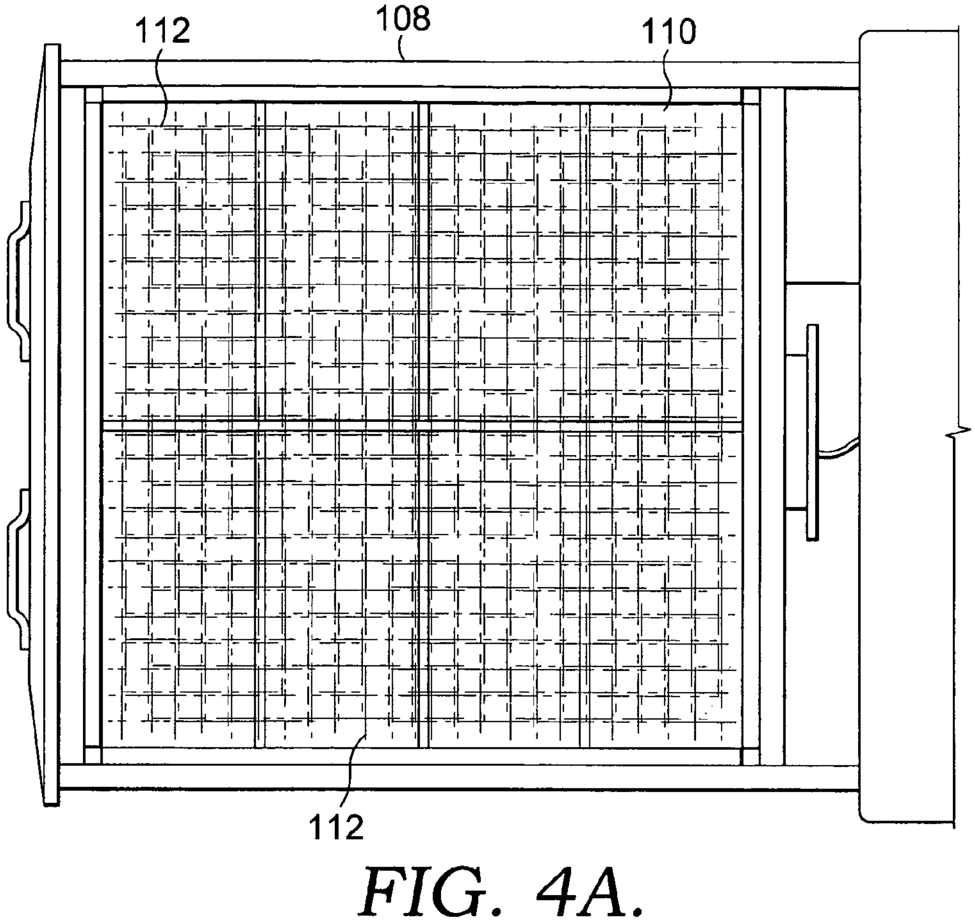
FIG. 4A is a perspective view of the multi-compartment tray shown in FIG. 3 received in the tray-receiving component of the medication loading and delivery unit and having a light grid over the top surface thereof in accordance with an embodiment of the present invention.

The method of the present invention utilizes a light grid present over the top surface of the multi-compartment tray 110. A light grid 112 in accordance with one embodiment of the present invention is shown in FIG. 4A. The light grid 112 is comprised of a plurality of light beams which, in the illustrated embodiment, laterally and longitudinally span the top surface of the multi-compartment tray 110 in a grid-like pattern. It will be understood and appreciated by those of ordinary skill in the art, however, that the light grid 112 may take on any number of configurations so long as when a medication or other object interrupts one or more of the plurality of light beams, as more fully described below, the interruption may be detected and the location thereof determined, as well as the corresponding location within the multi-compartment tray 110. Whatever the configuration of the light grid 112, however, the plurality of light beams are configured such that it is at least highly unlikely that objects of the size and shape that will be loaded into the multi-compartment tray 110 can be loaded therein without interrupting at least one light beam forming the light grid 112. For instance, in the grid-like configuration shown in FIG. 4A, the light beams are spaced from one another at a distance smaller than the smallest dimension of the medications that will be loaded therein such that it is highly unlikely that a medication will pass through undetected. In a currently preferred embodiment, each of the plurality of light beams is a low intensity laser beam.

Figure 4B:
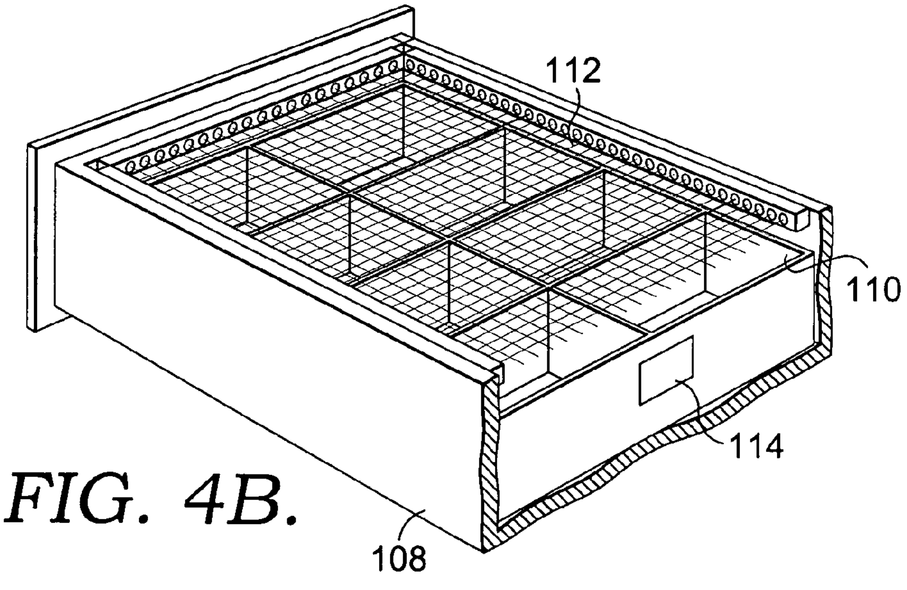
FIG. 4B is a perspective view of the multi-compartment tray shown in FIG. 3 received in the tray-receiving component and having a tray identification device coupled therewith in accordance with an embodiment of the present invention.

With reference to FIG. 4B, it can be seen that the multi-compartment tray 110 further includes a tray identification device 114 coupled therewith that is capable of being read by the medication loading and delivery unit 100 upon the tray 110 being received into the tray-receiving component 108. Upon reading the tray identification device 114, the medication loading and delivery unit 100 is capable of identifying the tray and retrieving or accessing information, e.g., a medication profile, to be associated therewith, as more fully described below. By way of example only, and not limitation, the tray identification device 114 may be a bar code capable of being read by a bar code scanner and the information associated therewith retrieved from an database or the like accessible through a network (e.g., network 26 of FIG. 1), or the tray identification device 114 may be a radio frequency identification device (RFID) capable of having information, e.g., a medication profile, associated with the tray stored therein and retrieved therefrom upon being read by the medication loading and delivery unit 100.

Figure 5A:
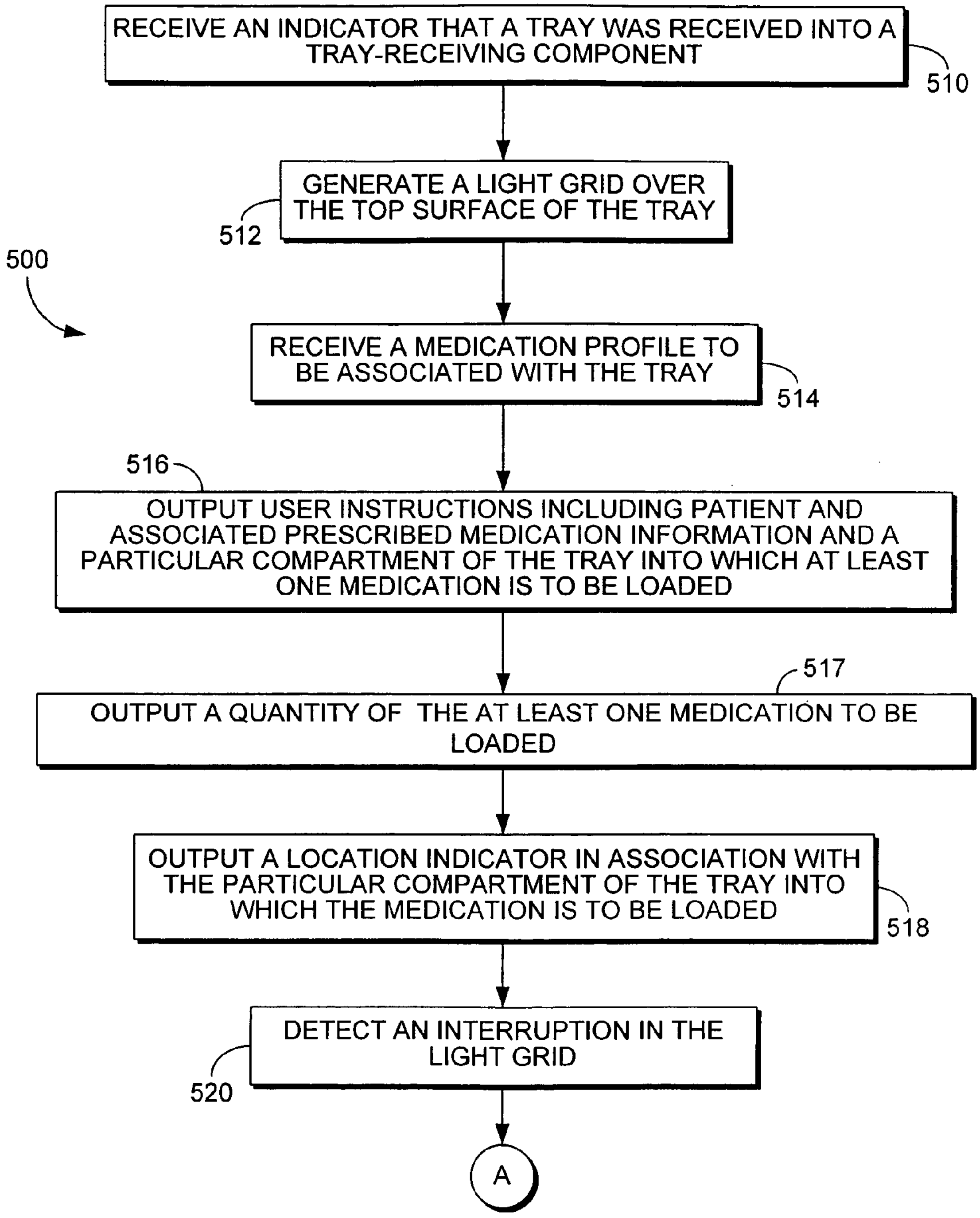
FIGS. 5A and 5B are a flow chart representative of a computer program for loading a tray with at least one medication, the tray having a light grid over a top surface thereof, in accordance with an embodiment of the present invention.
Figure 5B:
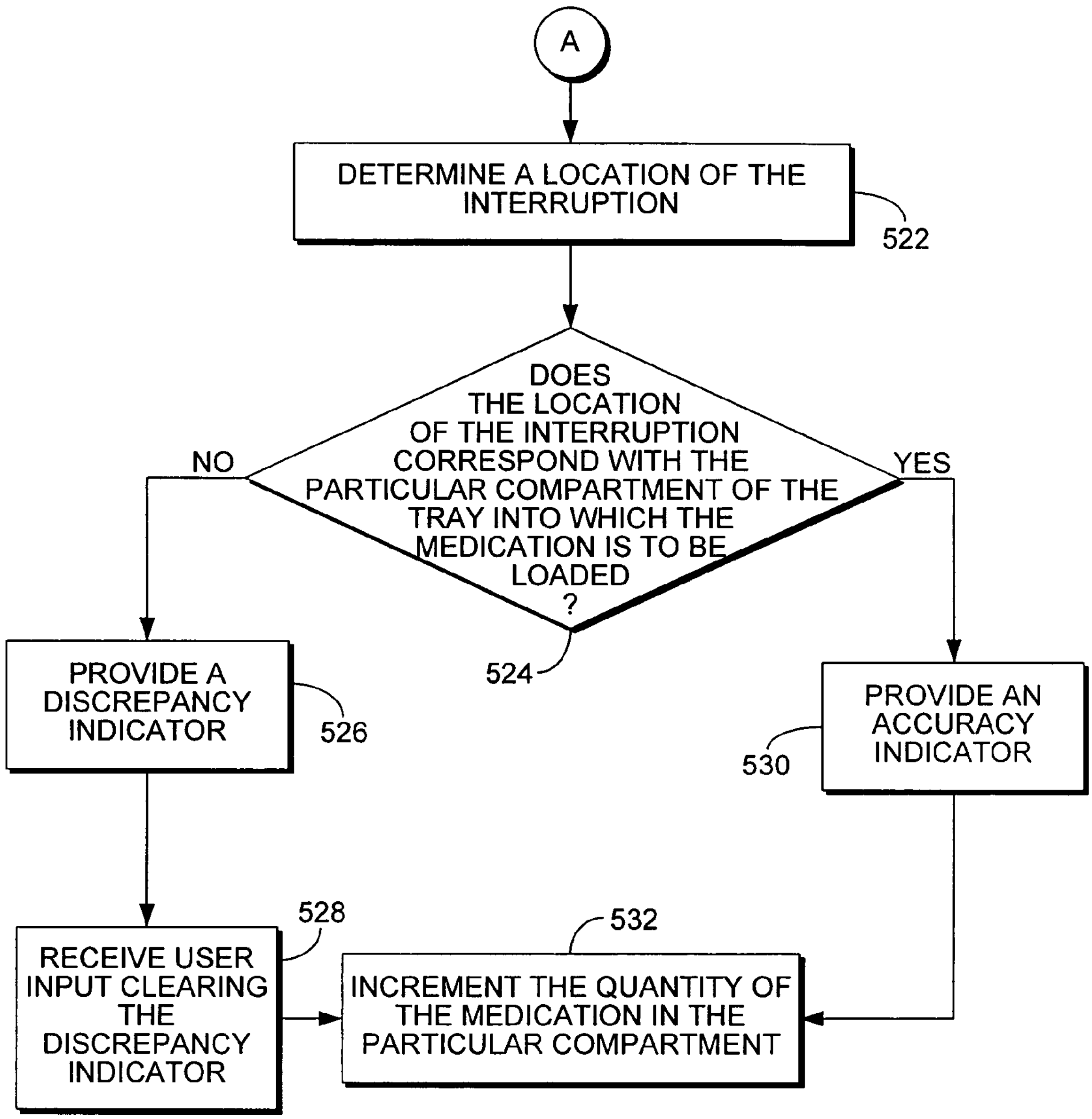

Turning to FIGS. 5A and 5B, a flow diagram is illustrated which shows a method 500 which may be implemented in the above-described exemplary computing environment 20 (FIG. 1) using the exemplary medication loading and delivery unit 100 shown in FIGS. 2 and 3 for loading a tray, e.g., a multi-compartment tray, with at least one medication and representing information corresponding thereto on an exemplary user interface. By way of example only, the method 500 of FIG. 5 may be utilized by a pharmacist or other qualified individual, to load at least one medication into a multi-compartment tray, the compartments within the tray being used, for example, to separate a medication of one type or dosage from a medication of a different type or dosage. The tray, once loaded, may then be delivered to a nursing station or patient bedside for administration of the medication(s) to at least one patient, as more fully described below.

Initially, at block 510 of FIG. 5A, the system receives an indicator that a tray, for instance, the multi-compartment tray 110 of FIGS. 3 and 4, was received into a tray-receiving component, e.g., the tray-receiving component 108 shown in FIG. 3. Subsequently, as shown at block 512, a light grid is generated over the top surface of the tray (e.g., light grid 112 of FIG. 4) such that when the light grid is interrupted, the location of the interruption and a corresponding location within the multi-compartment tray are capable of being determined, as more fully described below.

Next, as shown at block 514, the system receives information, e.g., a medication profile, to be associated with the tray. As previously described, the medication profile may be accessed from a database upon the tray identification device 114 (FIG. 4B) being read by the medication and delivery unit 100 (FIG. 2), or the medication profile may be stored in the tray identification device 114 and retrieved therefrom. The medication profile may include, by way of example only, information identifying at least one or more individuals for whom the medication to be loaded into the tray has been prescribed, one or more types of individuals for whom the medication to be loaded is likely to be prescribed (e.g., post-delivery obstetrics patients), an identity of the prescribed medication, and a dosage of the prescribed medication. It should be noted that the terms "individual", "person", and "patient" are used interchangeably herein and are not meant to limit the nature of the referenced individual in anyway. Rather, the methods and systems described herein are equally applicable in a variety of in-patient and out-patient settings, as will be understood by those of ordinary skill in the art. Further, use herein of the term "patient" is not meant to imply any particular relationship between the individual in question and those loading or delivering the multi-compartment tray. Nor is use of the terms such as "physician" and/or "clinician" meant to imply any particular relationship between the referenced individual and those individuals for whom medications are being loaded and/or delivered.

Figure 6:
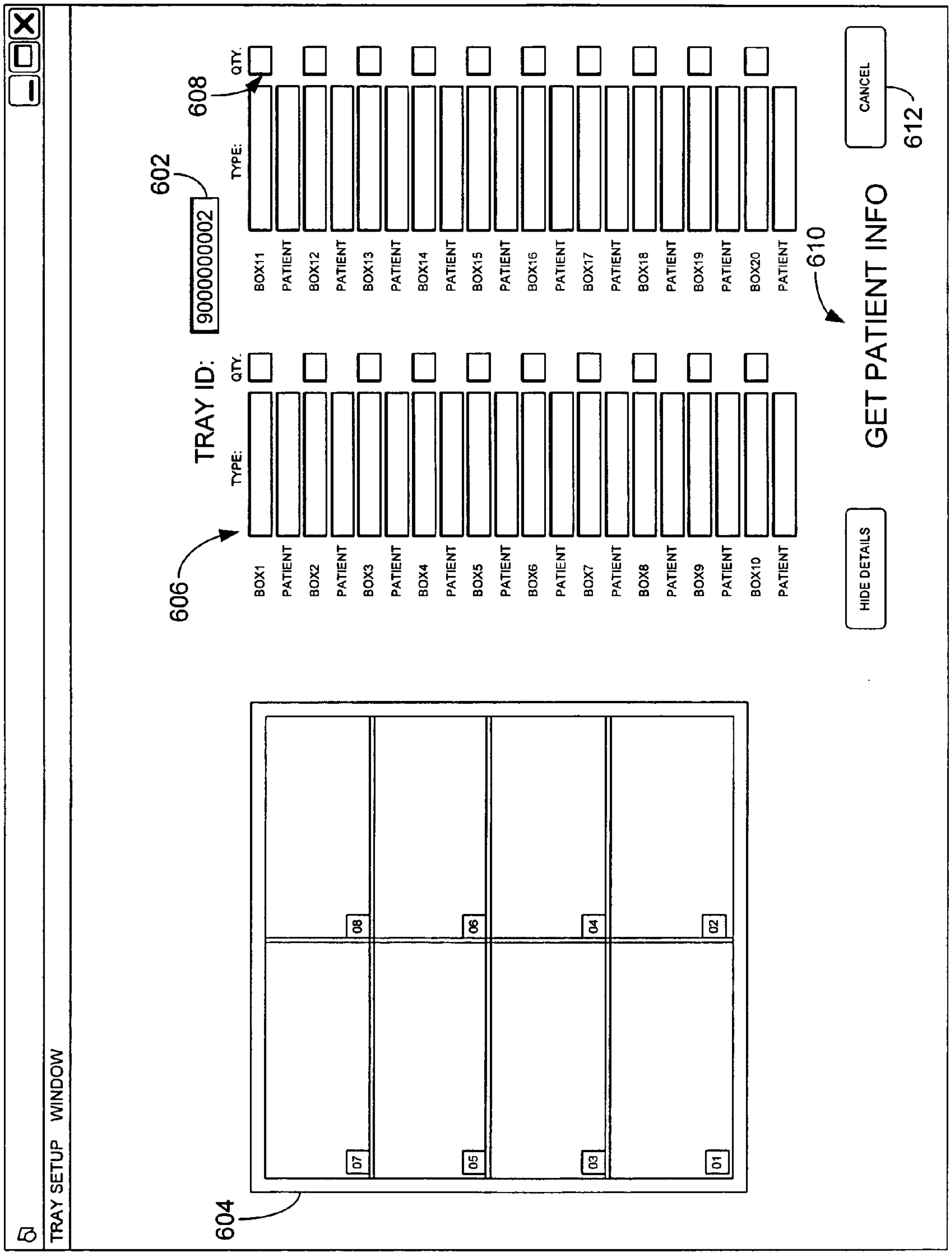
FIG. 6 is a schematic of an illustrative screen display showing a tray representation display area corresponding to the multi-compartment tray of FIG. 4A, wherein a user is being prompted to retrieve or enter patient information corresponding to the at least one medication to be loaded into the tray, in accordance with an embodiment of the present invention.

Referring to FIG. 6, an exemplary user interface for outputting, e.g., displaying, the information associated with loading at least one medication into a tray (or removing at least one medication from a tray, as more fully described below) is illustrated and designated generally as screen display 600. The screen display 600 includes a tray identification display area 602 for displaying an identification number or code by which the tray and the medication profile associated therewith may be identified upon the medication loading and delivery unit being loaded into the tray-receiving component and reading the tray identification device associated therewith, as hereinabove described. In the illustrated embodiment, the tray has been identified as having the tray identification code 9000000002. Screen display 600 further includes a tray representation display area 604 for displaying a visual image representative of the tray that has been loaded into the tray-receiving component. By way of example only, the tray representation display area 604 of FIG. 6 includes a multi-compartment tray configuration representative of the multi-compartment tray 110 of FIGS. 3, and 4 wherein there are eight compartments of approximately equal size and shape. The compartments in the tray representation display area 604 are referred to as "boxes" and are numbered sequentially as one through eight as indicated.

The exemplary screen display 600 further includes a profile display area 606 for displaying user loading and/or delivery instructions to be output by the system, as more fully described below. The user instructions may include, by way of example only, patient and associated prescribed medication information derived from the medication profile associated with the multi-compartment tray and the particular compartment of the tray into which a particular medication is to be loaded. The information included in the user instructions may be retrieved from the tray identification device (e.g., tray identification device 114 of FIG. 4B), through a network, e.g., network 26 of FIG. 1, from a server computer, e.g., control server 22 (FIG. 1), and/or one or more databases (e.g., database cluster 24 (FIG. 1)), wherein the information may be stored. Alternatively, the user (that is, the pharmacist or other authorized individual) may manually input the information comprising the user instructions using the input device 106 (FIG. 2). Any such variation, or any combination thereof, is contemplated to be within the scope of the present invention.

The exemplary profile display area 606 includes, by way of example only, fields corresponding to the box, i.e., the compartment, of the tray to be loaded and the patient with whom the medication in the box/compartment is to be associated. Although twenty boxes are represented in the profile display area 606, information may only be retrieved for or entered into the number of boxes which correspond to the tray represented in the tray representation display area 604. Thus, in the illustrated embodiment, information comprising user instructions may be entered or retrieved only for boxes one through eight. The exemplary screen display 600 further includes a quantity display area 608 for displaying a quantity of medication to be loaded into each box/compartment.

Screen display 600 further includes a user instruction display area 610 for outputting to the user instructions for proceeding with the method of loading (and/or unloading) the tray in accordance with the present invention. By way of example only, the user instruction display area 610 indicates to the user to "GET PATIENT INFO" to indicate that the user instructions to be associated with the loading of the tray are to be retrieved or entered before the method of the present invention may progress.

Screen display 600 further includes a cancel indicator 612 which may be selected by the user at any time to stop the action being undertaken and terminate the medication loading (and/or unloading) procedure.

Returning to FIG. 5A, user instructions are subsequently output which prompt the user to load the tray in accordance with the medication profile, as indicated at block 516. As previously described, the user instructions may include, by way of example only, patient and associated prescribed medication information derived from the medication profile associated with the tray and a particular compartment of the tray into which a particular medication is to be loaded. The system subsequently (or simultaneously) outputs a quantity of the at least one medication to be loaded, as indicated at block 517. Next, if desired, the system may output a location indicator in association with the particular compartment of the tray into which the medication is to be loaded, as shown at block 518.

Figure 7:
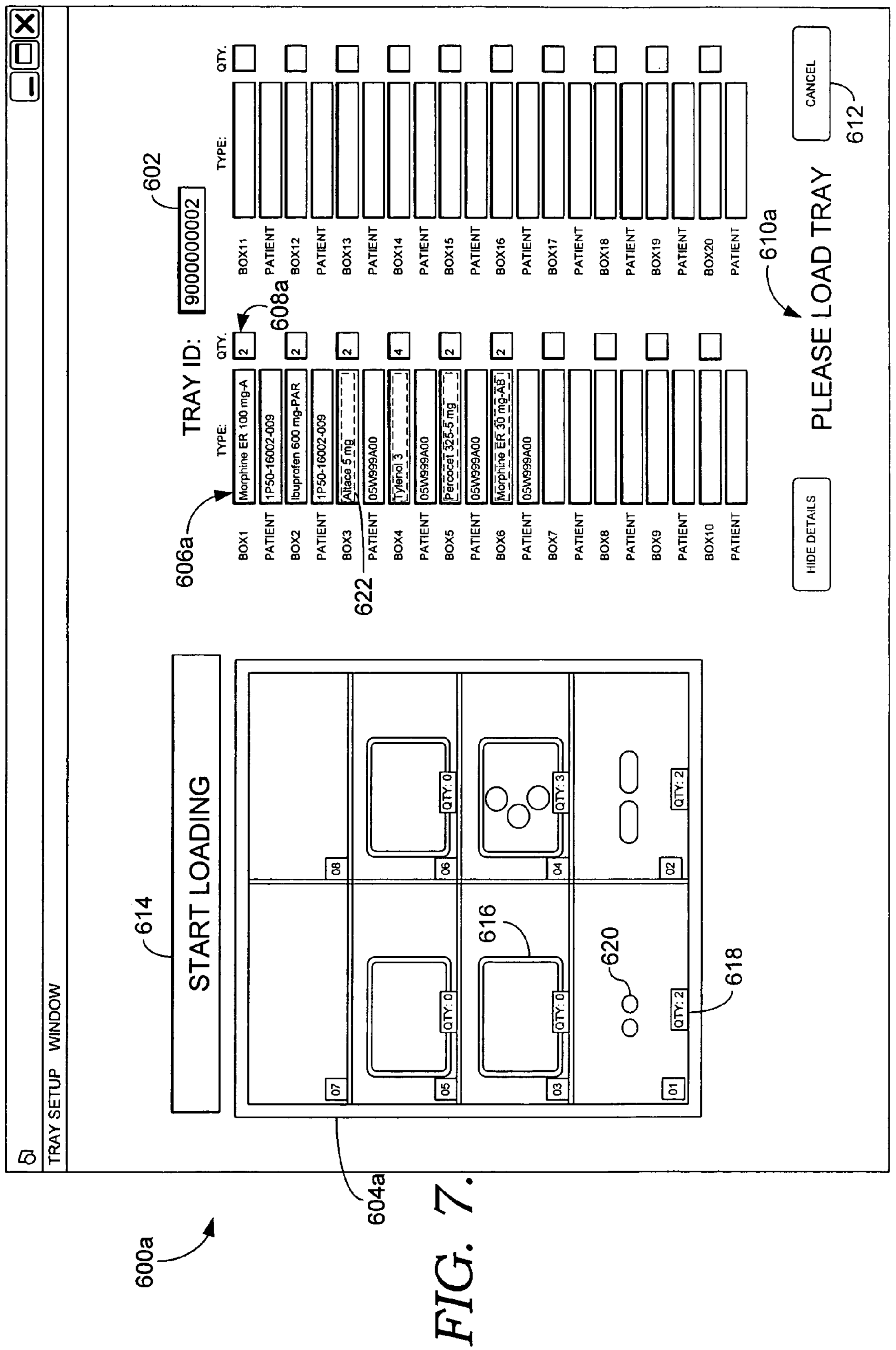
FIG. 7 is a schematic of the illustrative screen display of FIG. 6 after the patient data has been entered or retrieved, wherein the user is being prompted to begin loading medication into the tray, in accordance with an embodiment of the present invention.

With reference to FIG. 7, an exemplary user interface for outputting loading (and/or unloading) instructions to the user is illustrated and designated generally as screen display 600*a*. The screen display 600*a* includes a tray identification display area 602 identical to that shown in FIG. 6 referring to the same tray identification code indicating that the loading instructions displayed are with regard to the tray identified by code 9000000002. The screen display 600*a* further includes a tray representation display area 604*a*, a profile display area 606*a*, and a quantity display area 608*a*, similar to the corresponding display areas (604, 606, and 608, respectively) of FIG. 6 but with additional information pertaining to the loading instructions displayed thereon. For instance, the tray representation display area 604*a* of screen display 600*a* includes location indicators 616 within the illustrated boxes in association with those compartments into which medications still need to be loaded to coincide with the medication profile associated with the tray represented, i.e., multi-compartment tray 110 (FIGS. 3 and 4). In the illustrated example, each of boxes 3, 4, 5 and 6 still need at least one medication to be loaded therein to coincide with the medication profile for tray ID 9000000002.

The tray representation display area 604*a* further includes a visual medication representation area 620 which shows a visual representation of the quantity of medications already loaded into the indicated box and a loaded medications display area 618 which shows a numerical value representative of the quantity of medications already loaded into the represented compartment. The quantity of medications shown in the visual medication representation area 620 corresponds with the quantity displayed in the loaded medications display area 618.

The profile display area 606*a* includes dashed lines 622 in the fields for those boxes in which the quantity of medications to be loaded (shown in the quantity display area 608*a*) does not correspond to the quantity of medications shown in the loaded medications display area 618 for the given box, that is, those compartments within which a location indicator 616 is shown. In the illustrated screen display 600*a*, the quantity of medications to be loaded shown in the quantity display area 608*a* does not correspond with the quantity of medications shown in the loaded medications display area 618 for each of boxes 3, 4, 5, and 6. Thus, location indicators 616 are shown in association with these boxes in the tray representation display area 604*a* and dashed lines are included in the fields representative of those boxes in the profile display area 606*a*. It will be understood by those of ordinary skill in the art that rather than dashed lines, those fields corresponding to boxes for which the quantity shown in the quantity display area 618 does not correspond with the quantity of medications to be loaded shown in the quantity display area 608*a* may be shaded, colored, or otherwise set apart from the remaining fields in the profile display area 606*a* and that the dashed-line configuration is not intended to limit the scope of the present invention in any way.

The screen display 600*a* further includes an additional user instruction display area 614 prompting the user to initiate the action necessary for proceeding with the method of loading (and/or unloading) the multi-compartment tray in accordance with the present invention. By way of example only, the additional user instruction display area 614 indicates to the user to "START LOADING" to indicate that at least one medication must be loaded into the tray in order for the medications therein to properly correspond with the medication profile associated with the multi-compartment tray.

Referring back to FIG. 5A, as the user begins to load the tray with the indicated medication, the system detects an interruption in the light grid, as shown at block 520. With reference to FIG. 5B, the system subsequently determines the location of the interruption in the light grid, as shown at block 522. As will be understood by those of ordinary skill in the art, since the system detects interruptions in the light grid, medications must be loaded (and/or unloaded, as more fully described below) into the tray individually, that is one at a time. If multiple medications are loaded into a particular compartment simultaneously, the system may detect only one interruption in the light grid and, consequently, register that only one medication has been loaded therein. Loading (and/or unloading) medications into the tray individually ensures an accurate quantity count is maintained.

Next, as indicated at block 524, it is determined whether the location of the interruption corresponds with the particular compartment of the multi-compartment tray into which the medication is to be loaded, that is, the compartment output in the user instructions at block 516 of FIG. 5A. If the location of the interruption does not correspond with the particular compartment of the tray output in the user instructions, the system provides a discrepancy indicator alerting the user that the medication has been improperly loaded. This is shown at block 526. In a currently preferred embodiment, the user must provide the system with some sort of input, for example, removing the improperly loaded medication through the improper location in the light grid and properly loading the medication through the proper location in the light grid, prior to the system prompting any further action. This is shown at block 528. If, on the other hand, the location of the interruption does correspond with the particular compartment of the multi-compartment tray output in the user instructions, the system provides an accuracy indicator informing the user that the medication has been properly loaded. This is shown at block 530.

Either upon receipt of user input clearing a discrepancy indicator or upon providing an accuracy indicator, the system increments the quantity of the medication loaded in the particular compartment, as indicated at block 532.

Figure 8:
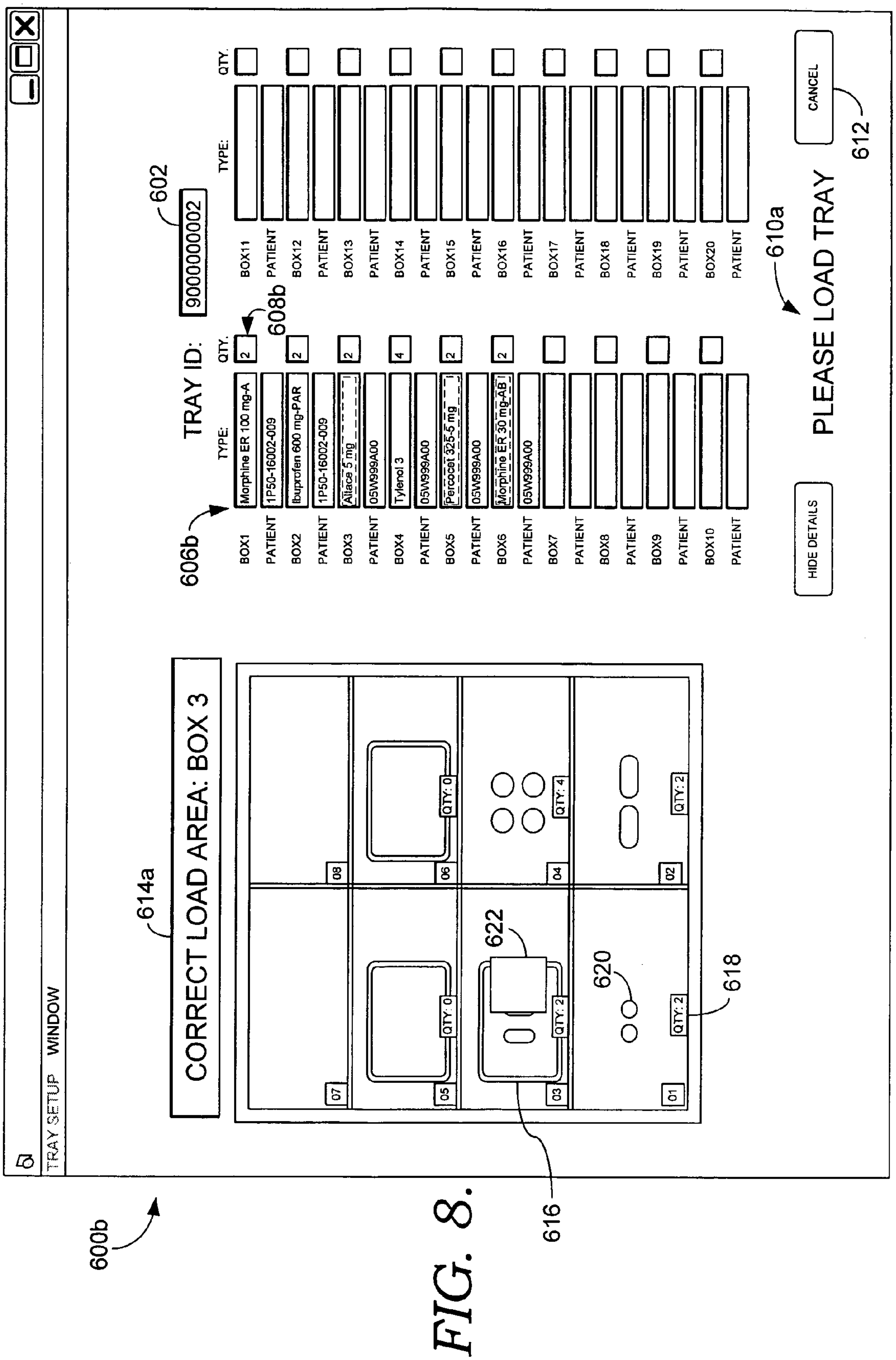
FIG. 8 is a schematic of an illustrative screen display showing that medication has been correctly loaded into the tray in accordance with an embodiment of the present invention.

With reference to FIG. 8, an exemplary screen display showing an accuracy indicator 622 in accordance with an embodiment of the present invention is illustrated and designated generally as reference numeral 600*b*. If desired, the accuracy indicator 622 may be colored, for instance a green indicator, to indicate a desired action has been taken. It should be noted that the additional instruction area 614*a* also indicates to the user that a medication has been correctly loaded into box 3.

It should also be noted that in the exemplary screen display 600*b* of FIG. 8, relative to the screen display 600*a* of FIG. 7, the location indicator 616 within box 4 has been removed, as has the dashed line surrounding the field representative of the medication to be placed in box 4. Further the visual representation of the quantity of medications 620 and the quantity indicated in the loaded medications display area 618 associated with box 4 have been modified. These changes indicate that a medication has been loaded into box 4 which brought the quantity of medications loaded into box 4 in correlation with the quantity of medications to be loaded into box 4 shown in the quantity display area 608*b* associated therewith.

Figure 9:
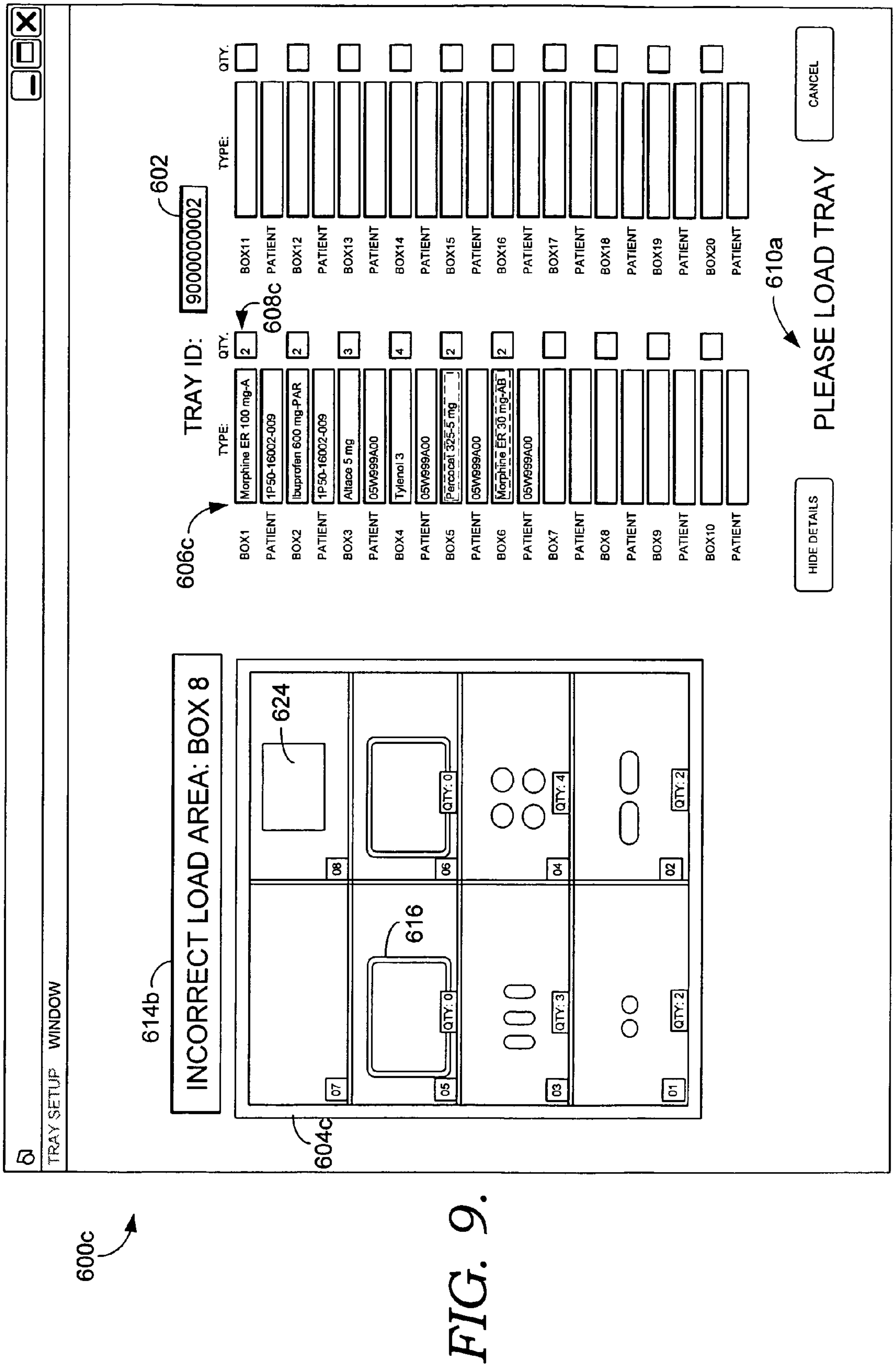
FIG. 9 is a schematic of an illustrative screen display showing that medication has been incorrectly loaded into the tray in accordance with an embodiment of the present invention.

With reference to FIG. 9, an exemplary screen display showing a discrepancy indicator 624 in accordance with an embodiment of the present invention is illustrated and designated generally as reference numeral 600*c*. The discrepancy indicator 624 is shown in the screen display 600*c* of FIG. 9 to indicate that a medication has been loaded into box 8 whereas the user instructions output in the profile display area 606*a* indicate that no medication is to be placed in box 8 of tray ID 9000000002. If desired, the discrepancy indicator 624 may be colored, for instance a red indicator, to indicate that an undesired action has been taken. It should be noted that the additional instruction area 614*b* indicates to the user that a medication has been incorrectly loaded into box 8 of the multi-compartment tray.

It should also be noted that in the exemplary screen display 600*c* of FIG. 9, relative to the screen display 600*b* of FIG. 8, the location indicator within box 3 has been removed, as has the dashed line surrounding the field representative of the medication to be placed in box 3. Further, the visual representation of the quantity of medications 620 and the quantity indicated in the loaded medications display area 618 associated with box 3 have been modified. These changes indicate that a medication was loaded into box 3 which brought the quantity of medications loaded into box 3 in correlation with the quantity of medications to be loaded into box 3 shown in the quantity display area 608*c*.

Figure 10:
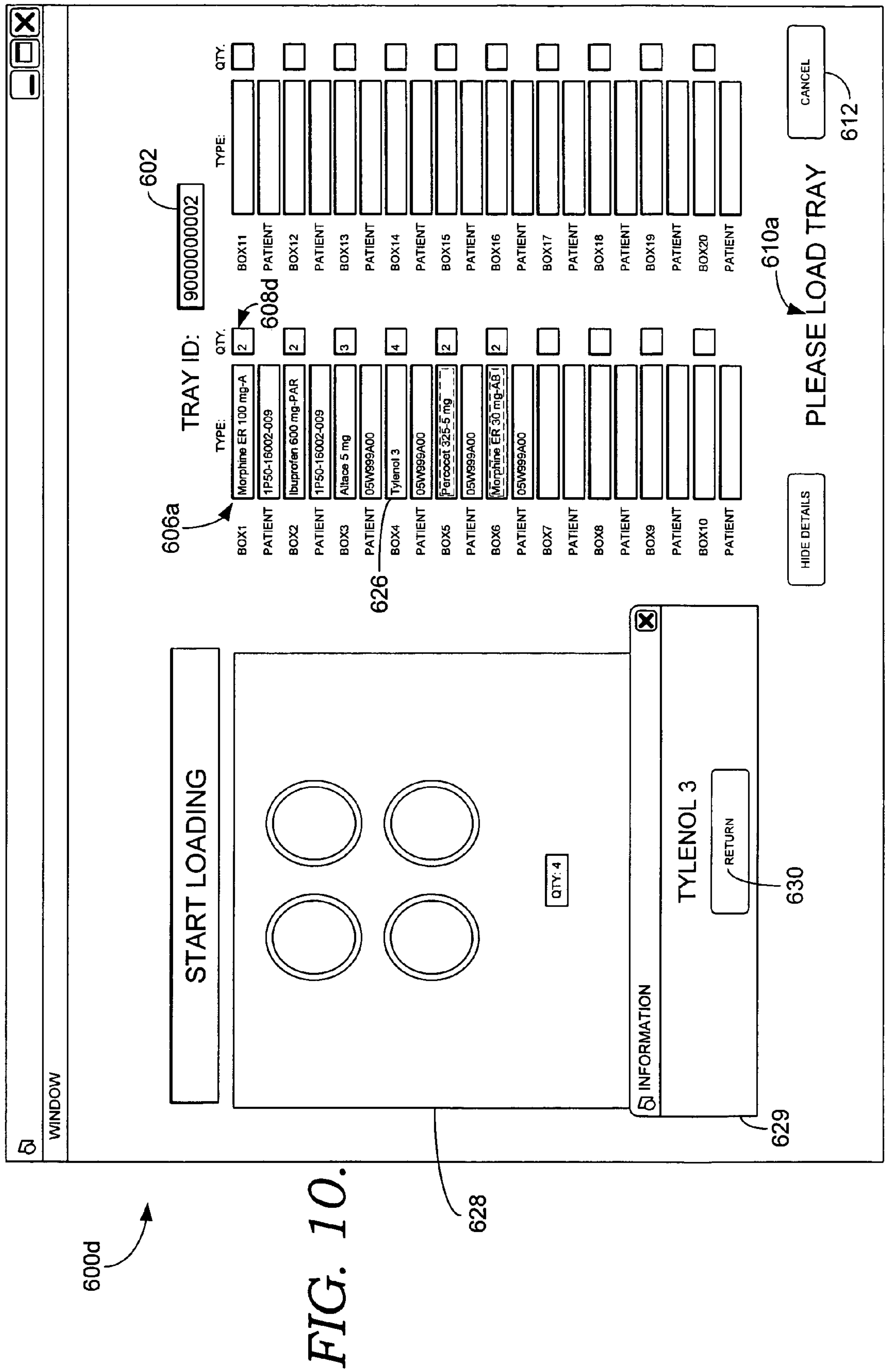
FIG. 10 is a schematic of an illustrative screen display showing information relating to one of the medications that the user has been instructed to load into the tray, such information being accessible from the screen display of any of FIG. 7, 8, or 9, in accordance with an embodiment of the present invention.

If desired, additional information concerning the medication(s) to be loaded into the multi-compartment tray may be accessed upon user selection of the field representing the medication to be loaded in the particular compartment shown in the profile display area 606*c* (FIG. 9). FIG. 10 illustrates an exemplary user interface, designated generally as reference numeral 600*d*, showing that additional information has been requested with regard to the medication loaded in box 4, that is, Tylenol 3. Upon user selection of the field 626 representing the medication to be loaded in box 4, the visual representation of the medication shown in box 4 is enlarged to encompass the entire tray representation display area, the enlarged display being indicated as reference numeral 628. Beneath the enlarged display is an information window 629 which may contain additional information regarding the medication loaded in box 4. In the illustrated display screen 600*d*, no additional information is illustrated. However, it will be understood by those of ordinary skill in the art that any information available from one or more databases (e.g., database cluster 24 of FIG. 1) through a network 26 (e.g., network 26 of FIG. 1) may be displayed in the information window 629 from contraindications to age-appropriate dosages and the like. Selection of the return indicator 630 will return the user to the screen display 600*c* of FIG. 9.

Figure 11:
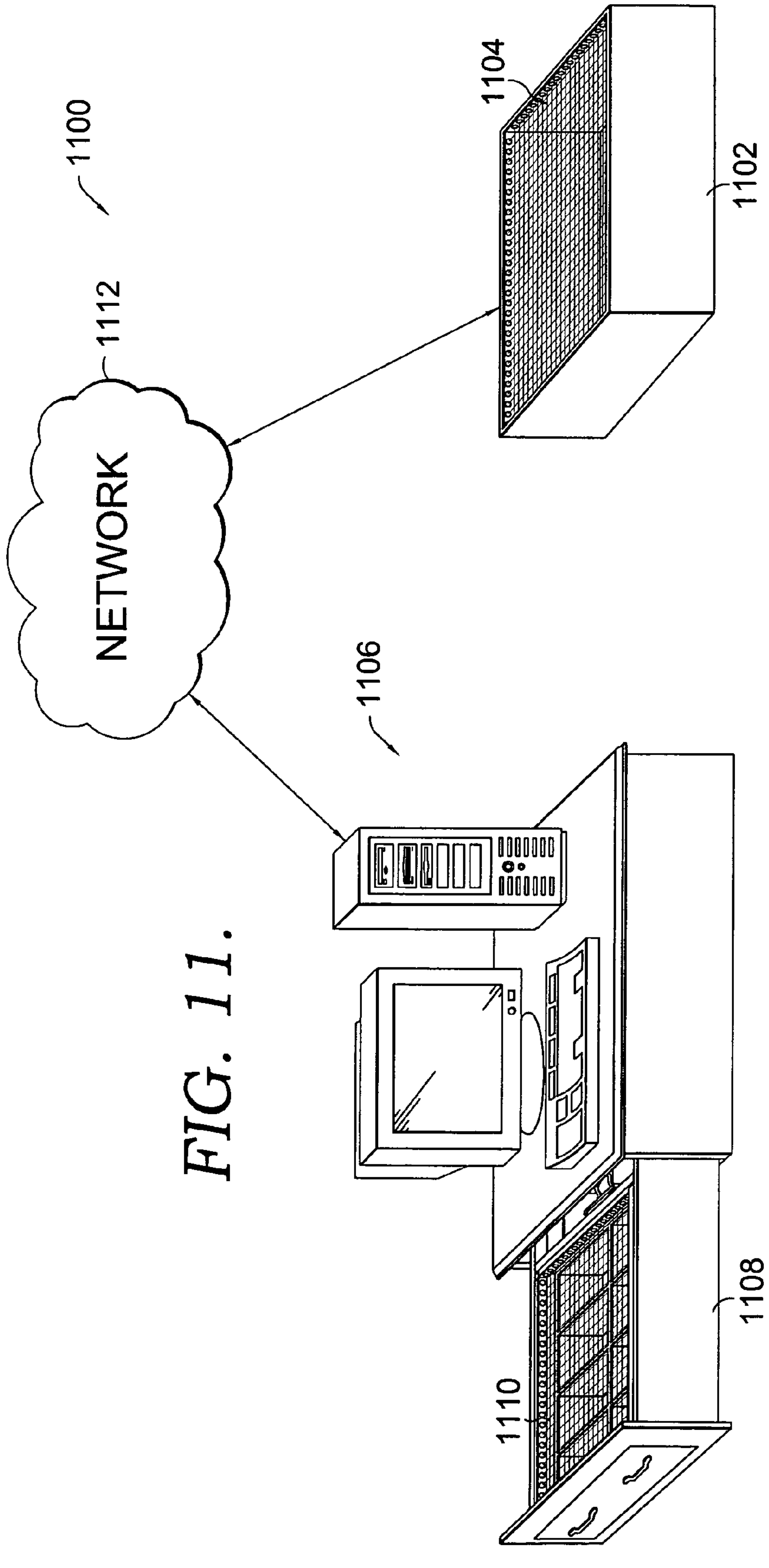
FIG. 11 is a diagram of a computing system configuration suitable for use in implementing an embodiment of the present invention wherein multiple light grids are in communication with one another through a network.

In another embodiment, the present invention relates to a computerized method and system for loading medication from a medication supply container into a tray, each of the tray and the medication supply container having a light grid over a respective top surface thereof. With reference to FIG. 11, an exemplary computing system configuration on which this embodiment of the present invention may be implemented is illustrated and designated generally as reference numeral 1100. By way of example only, the computing system configuration 1100 of FIG. 11 may be used by a pharmacist, or other authorized pharmacy personnel, to load a tray with medications specific to one or more patients from medication supply bins having particular medications in bulk quantities therein.

Computing system configuration 1100 includes a medication supply container 1102, e.g., a bulk medication supply bin, a medication loading and delivery unit 1106 (similar to the medication loading and delivery unit 100 of FIGS. 2 and 3), and a network 1112. The medication supply container 1102 includes a light grid 1104 (e.g., a light grid similar to light grid 112 of FIG. 4A) over a top surface thereof. The medication loading and delivery unit 1106 includes a tray-receiving component 1108 (e.g., a tray-receiving component similar to tray-receiving component 108 of FIG. 3) having a multi-compartment tray received therein and a light grid 1110 (e.g., a light grid similar to light grid 112 of FIG. 4A) over a top surface thereof. Light grid 1104 and light grid 1110 are in communication with one another through network 1112 such that it may be determined whether or not a quantity of medication removed from the medication supply container 1102 corresponds with a quantity of medication loaded in the tray received in the tray-receiving component 1108, as more fully described below.

Figure 12:
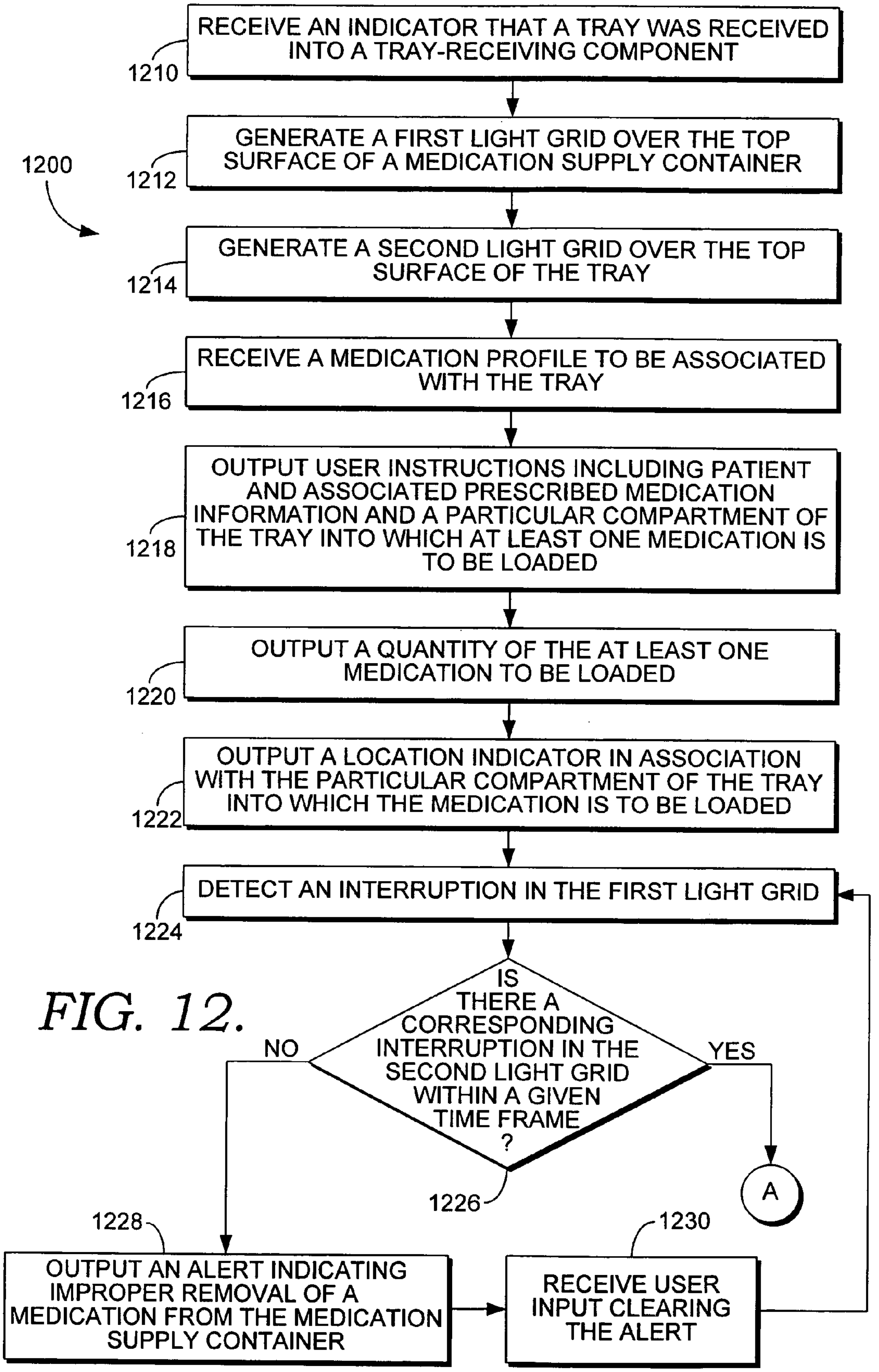
FIG. 12 is a flow chart representative of a computer program for loading a multi-compartment tray with medication from a medication supply container, each of the multi-compartment tray and the medication supply container having a light grid over a respective top surface thereof, in accordance with an embodiment of the present invention.

A method 1200 for loading medication from a medication supply container into a tray, each of the tray and the medication supply container having a light grid over a respective top surface thereof, is shown in the flow diagram of FIG. 12. By way of example only, method 1200 may be used in a pharmacy setting where a pharmacist or other authorized individual may remove at least one medication from a bulk supply container and load it into a multi-compartment tray for delivery to one or more patients, as more fully described below.

Initially, as shown at block 1210, the system receives an indicator that a tray, for instance, the multi-compartment tray 110 of FIGS. 3 and 4, was received into a tray-receiving component, e.g., the tray-receiving component 1108 shown in FIG. 11. Subsequently, as shown at block 1212, a first light grid (e.g., light grid 1104 of FIG. 11) is generated over the top surface of a medication supply container (e.g., bulk medication supply bin 1102 of FIG. 11). Next, as shown at block 1214, a second light grid (e.g., light grid 1110 of FIG. 11) is generated over the top surface of the tray.

Next, as shown at block 1216, the system receives information, e.g., a medication profile, to be associated with the tray. As previously described, the medication profile may be accessed from a database upon the tray identification device (e.g., tray identification device 114 of FIG. 4B) being read, for instance, by the medication and delivery unit 1106 of FIG. 11, or the medication profile may be stored in the tray identification device and retrieved therefrom. The medication profile may include, by way of example only, information identifying at least one individual for whom the medication to be loaded into the tray has been prescribed, an identity of the prescribed medication, and a dosage of the prescribed medication.

Subsequently, as shown at block 1218, user instructions are output which prompt the user to load the tray in accordance with the medication profile. As previously described, the user instructions may include, by way of example only, patient and associated prescribed medication information derived from the medication profile associated with the tray and a particular compartment of the tray into which a particular medication is to be loaded. The system subsequently (or simultaneously) outputs a quantity of the at least one medication to be loaded, as indicated at block 1220. Next, if desired, the system may output a location indicator in association with the particular compartment of the tray into which the medication is to be loaded, as shown at block 1222.

As the user begins the loading process, the system detects an interruption in the first light grid, as shown at block 1224. Since interruptions in the light grid are being detected, medications must be removed from the medication supply container (e.g., medication supply container 1102 of FIG. 11) individually. Subsequently, as shown at block 1226, the system determines whether a corresponding interruption is detected in the second light grid within a given time frame. As the method of this embodiment of the present invention is intended to monitor a quantity of medications being removed from a medication supply container and determine its correspondence with a quantity of medications being loaded into a tray, a time frame of about ten seconds is generally appropriate. It will be understood and appreciated by those of ordinary skill in the art, however, that the time frame may be set at any desired length and the length of the time frame is not intended to limit the scope of the present invention in any way.

If there is a corresponding interruption detected in the light grid the method of the present invention proceeds in accordance with FIG. 5B. If there is not a corresponding interruption detected in the light grid within the given time frame, however, the system outputs an alert indicating to the user that a medication has been improperly removed from the medication supply container. This is indicated at block 1228. In a currently preferred embodiment, the user must provide the system with some sort of input, for example, replacing the improperly removed medication into the medication supply container through the first light grid (e.g., light grid 1104 of FIG. 11), prior to the system prompting any further action. This is shown at block 1230. Once the alert has been cleared, the method of this embodiment of the present invention may return to block 1224 wherein a subsequent interruption in the first light grid may be detected.

Utilizing this method of the present invention, a safety check is implemented wherein the quantity of medications removed from one location must correspond with the quantity of medications placed in another location or an alert is output. As such, improper medication loading is minimized.

Figure 13:
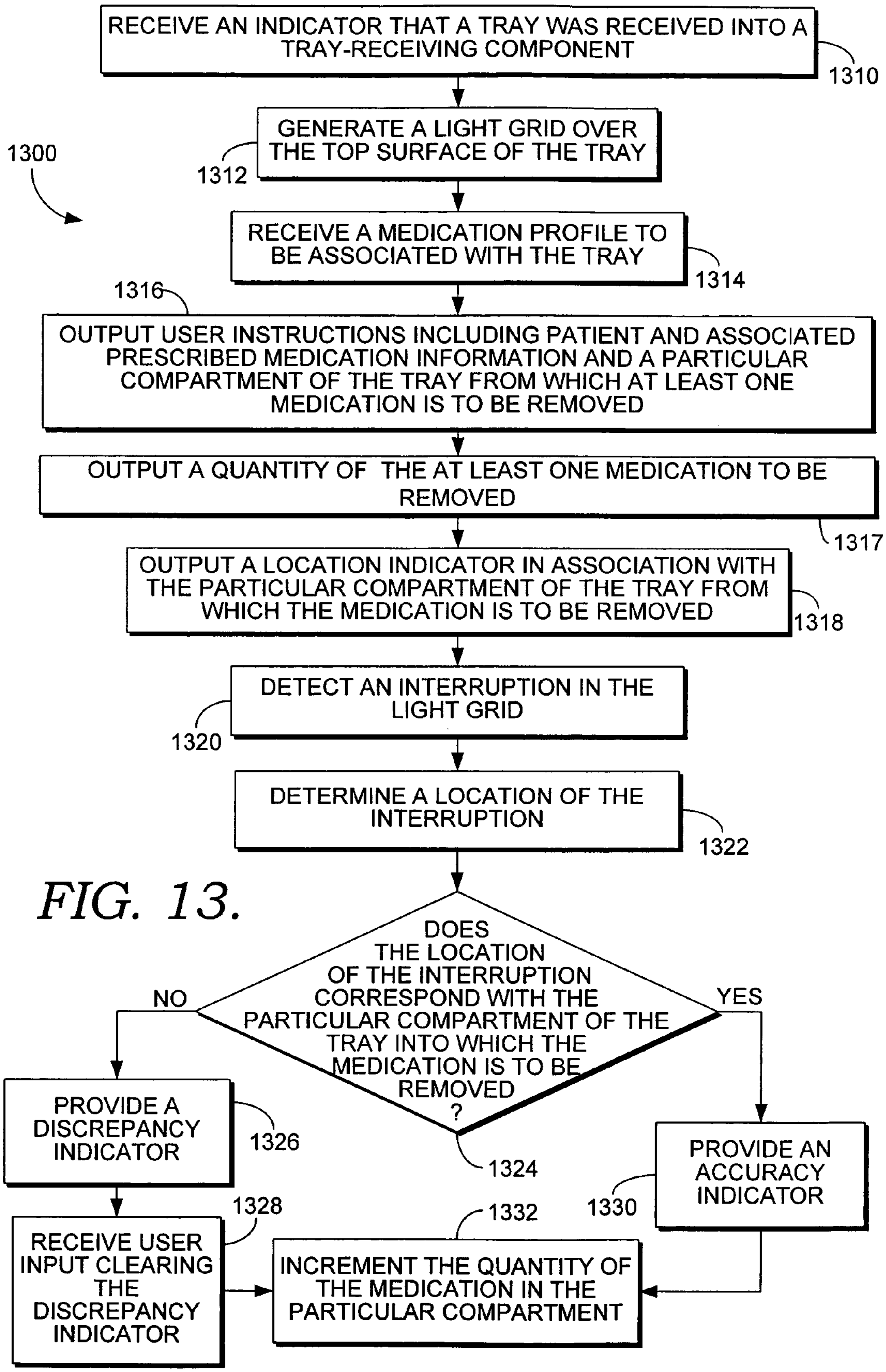
FIG. 13 is a flow chart representative of a computer program for delivering medication to at least one individual, the medication being removed from a tray having a light grid over a top surface thereof, in accordance with an embodiment of the present invention.

With reference to FIG. 13, a method 1300 in accordance with an embodiment of the present invention for delivering medication to at least one individual, the medication being removed from a tray having a light grid over a top surface thereof is illustrated. By way of example only, method 1300 may be used to deliver medications to a patient's bedside where a unit similar to the medication loading and delivery unit 100 shown in FIG. 2 may be located.

Initially, as shown at block 1310, the system receives an indicator that a tray, for instance, the multi-compartment tray 110 of FIGS. 3 and 4, was received into a tray-receiving component, e.g., the tray-receiving component 108 of FIG. 3. Subsequently, as shown at block 1312, a light grid is generated over the top surface of the tray (e.g., light grid 112 of FIG. 4) such that when the light grid is interrupted, the location of the interruption and a corresponding location within the multi-compartment tray are capable of being determined.

Next, as shown at block 1314, the system receives information, e.g., a medication profile, to be associated with the tray. The medication profile may include, by way of example only, information identifying at least one or more individuals for whom the medication to be loaded into the tray has been prescribed, an identity of the prescribed medication, and a dosage of the prescribed medication. Subsequently, user instructions are output which prompt the user to unload the tray in accordance with the medication profile, as indicated at block 1316. The user instructions may include, by way of example only, patient and associated prescribed medication information and a particular compartment of the tray from which a particular medication is to be removed. The system subsequently (or simultaneously) outputs a quantity of the medication to be removed, as indicated at block 1317. By way of example only, the user instructions may be output in a display area similar to the profile display area **606*a* of FIG. 7 and the quantity of medication to be removed may be output in a display area similar to quantity display area 608*a* of FIG. 7**.

Next, if desired, the system may output a location indicator in association with the particular compartment of the tray from which the medication is to be removed, as indicated at block 1318. With reference to FIG. 7, a location indicator prompting removal of a medication may be similar to the location indicators 616 utilized for loading at least one medication in the example described in association therewith.

Referring back to FIG. 13, as the user begins to remove the indicated medication from the tray, the system detects an interruption in the light grid, as shown at block 1320. Subsequently, as shown at block 1322, the system determines the location of the interruption in the light grid. As will be understood by those of ordinary skill in the art, since the system detects interruptions in the light grid, medications must be removed from the tray individually.

Next, as indicated at block 1324, it is determined whether the location of the interruption corresponds with the particular compartment of the multi-compartment tray from which the medication is to be removed, that is, the compartment output in the user instructions at block 1316. If the location of the interruption does not correspond with the particular compartment of the tray output in the user instructions, the system provides a discrepancy indicator alerting the user that the medication has been improperly removed, as indicated at block 1326. With reference to FIG. 9, a discrepancy indicator indicating an improperly removed medication may be similar to discrepancy indicator 624 utilized to indicate improper loading in the example associated therewith. In a currently preferred embodiment, the user must provide the system with some sort of input, for example, replacing the improperly removed medication through the improper location in the light grid and properly removing a medication through the proper location in the light grid, prior to the system prompting any further action. This is shown at block 1328.

If, on the other hand, the location of the interruption does correspond with the particular compartment of the multi-compartment tray output in the user instructions, the system provides an accuracy indicator informing the user that the medication has been properly removed. This is shown at block 1330. With reference to FIG. 8, an accuracy indicator indicating a properly removed medication may be similar to accuracy indicator 622 utilized to indicate proper loading in the example associated therewith.

Either upon receipt of user input clearing a discrepancy indicator or upon providing an accuracy indicator, the system decrements the quantity of the medication loaded in the particular compartment, as indicated at block 1332. For instance, the quantity of medication may be decremented in a display area similar to the loaded medication display area 618 of FIG. 7.

If desired, the trays and/or medication supply containers utilized in the methods of the present invention may further include a scanner over a top surface thereof which is capable of scanning an identification code coupled with the medication being loaded and/or removed from the multi-compartment tray. FIGS. 14 through 17 illustrate the various embodiments of the methods herein disclosed wherein a scanner is utilized in conjunction with the light grid.

Figure 14:
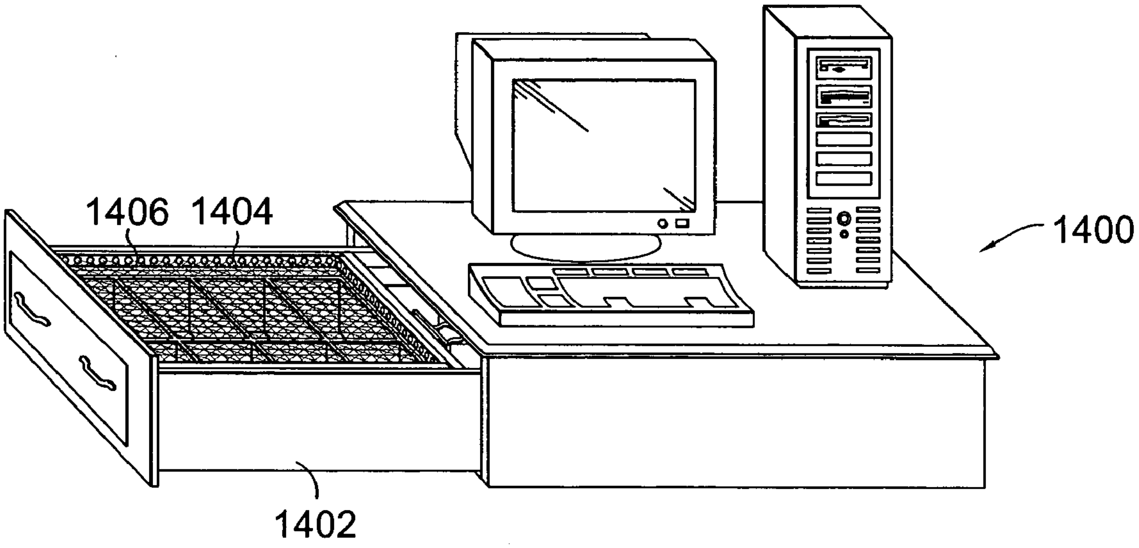
FIG. 14 is a perspective view of a medication loading and delivery unit in accordance with an embodiment of the present invention having a multi-compartment tray received in the tray-receiving component and having a light grid and a scanner over the top surface thereof.

Referring to FIG. 14, a medication loading and delivery unit 1400 is illustrated having a tray-receiving component 1402 in the open position such that an exemplary multi-compartment tray received therein is visible. The multi-compartment tray of FIG. 14 includes eight compartments of approximately equal size and shape, similar to multi-compartment tray 110 of FIG. 3. It will be understood by those of ordinary skill in the art, however, that a tray having any number of compartments in any desired configuration may be utilized and all such variations are contemplated to be within the scope of the present invention.

The medication loading and delivery unit 1400 further includes a light grid 1404 present over the top surface of the tray and a scanner 1406 also present over the top surface of the tray. In the illustrated embodiment, the light grid 1404 is comprised of a plurality of light beams which laterally and longitudinally span the top surface of the tray in a grid-like pattern. It will be understood and appreciated by those of ordinary skill in the art, however, that the light grid 1404 may take on any number of configurations so long as when a medication or other object interrupts one or more of the plurality of light beams, the interruption may be detected and the location thereof determined, as hereinabove described. Whatever the configuration of the light grid 1404, however, the plurality of light beams are configured such that it is at least highly unlikely that objects of the size and shape that will be loaded into the tray can be loaded therein without interrupting at least one light beam forming the light grid 1404. For example, in the grid-like configuration shown in FIG. 14, the light beams are spaced from one another at a distance smaller than the smallest dimension of the medications that will be loaded therein such that it is highly unlikely that a medication will pass through undetected.

In the illustrated embodiment, the scanner 1406 of FIG. 14 is similarly comprised of a plurality of beams. The beams forming the scanner 1406, however, are capable of reading an identification code coupled with the medication being loaded and/or removed from the multi-compartment tray, as more fully described below. By way of example, and not limitation, if the identification code coupled with the medication is a bar code (e.g., if the medication is an individually wrapped medication having a bar code on the packaging thereof), the beams forming the scanner 1406 may be bar code scanning beams capable of reading the bar code as it passes through one or more of the beams. In the embodiment illustrated in FIG. 14, the beams of the scanner span the top surface of the tray diagonally in a grid-like pattern. This configuration is shown primarily to differentiate it visually from the grid-like pattern of the light grid 1404. However, as will be understood by those of ordinary skill in the art, the beams forming the scanner may be configured in any desired manner so long as it is at least highly unlikely that objects of the size and shape that will be loaded into and/or removed from the tray can pass through the scanner undetected.

Turning to FIGS. 15A through 15D, a flow diagram is illustrated which shows a method 1500 which may be implemented in the above-described exemplary computing system environment 20 (FIG. 1) using the exemplary medication loading and delivery unit 1400 of FIG. 14 for loading a tray, e.g., a multi-compartment tray, with at least one medication and representing information corresponding thereto on an exemplary user interface. By way of example only, the method 1500 of FIGS. 15A through 15D may be utilized by a pharmacist or other qualified individual, to load at least one medication into a multi-compartment tray, the compartments within the tray being used, for example, to separate a medication of one type or dosage from a medication of a different type or dosage. The tray, once loaded, may then be delivered to a nursing station or patient bedside for administration of the medication(s) to at least one patient.

Initially, as shown at block 1510, the system receives an indicator that a tray, for instance, the multi-compartment tray 110 of FIGS. 3 and 4, was received into a tray-receiving component, e.g., the tray-receiving component 1402 of FIG. 14. Subsequently, as shown at block 1512, a light grid (e.g., light grid 1404 of FIG. 14) is generated over the top surface of the tray such that when the light grid is interrupted, the location of the interruption and a corresponding location within the multi-compartment tray are capable of being determined. Next, as shown at block 1514, a scanner (e.g., scanner 1406 of FIG. 14) is generated over the top surface of the tray such that when at least one medication having an identification code coupled therewith (e.g., having a bar code on the external packaging thereof) interrupts the scanner, the identity of the at least one medication is capable of being determined, as more fully described below.

Subsequently, as shown at block 1516, the system receives information, e.g., a medication profile, to be associated with the tray. As previously described, the medication profile may be accessed from a database upon a tray identification device (e.g., tray identification device 114 of FIG. 4B) being read by the medication and delivery unit 1400 (FIG. 14), or the medication profile may be stored in the tray identification device and retrieved therefrom. By way of example only, the medication profile may include information identifying at least one or more individuals for whom the medication to be loaded into the tray has been prescribed, an identity of the medication prescribed medication, and a dosage of the prescribed medication.

Next, user instructions are output which prompt the user to load the tray in accordance with the medication profile, as indicated at block 1518. The user instructions may include, by way of example only, patient and associated prescribed medication information derived from the medication profile associated with the tray and a particular compartment of the tray into which a particular medication is to be loaded. The system subsequently (or simultaneously) outputs a quantity of the at least one medication to be loaded, as indicated at block 1519. By way of example only, the user instructions may be output in a display area similar to the profile display area 606*a* of FIG. 7 and the quantity of medication to be loaded may be output in a display area similar to quantity display area 608*a* of FIG. 7.

If desired, the system may subsequently output a location indicator in association with the particular compartment of the tray into which the medication is to be loaded, as shown at block 1520. With reference to FIG. 7, a location indicator prompting loading of a medication may be similar to the location indicators 616 utilized for loading at least one medication in the example described in association therewith.

As the user beings to load the tray with the indicated medication, the system detects an interruption in the light grid, as shown at block 1522. Subsequently, as shown at block 1524, the system determines the location of the interruption in the light grid. As will be understood by those of ordinary skill in the art, since the system detects interruptions in the light grid, medications must be loaded (and/or unloaded) into the tray individually.

Figure 15A:
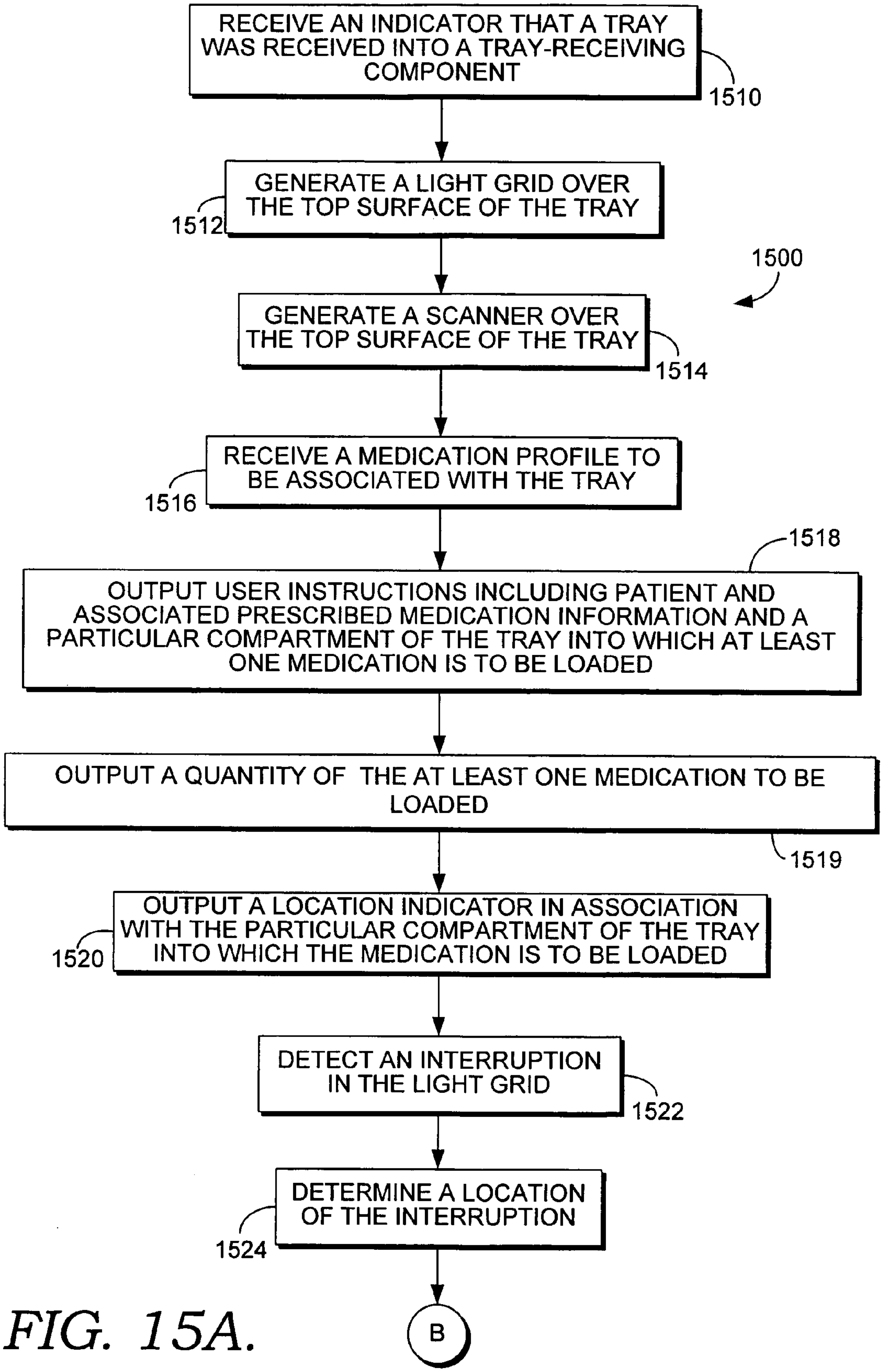
FIGS. 15A–15D are a flow chart representative of a computer program for loading a tray with at least one medication, the tray having a light grid and a scanner over a top surface thereof, in accordance with an embodiment of the present invention.
Figure 15B:
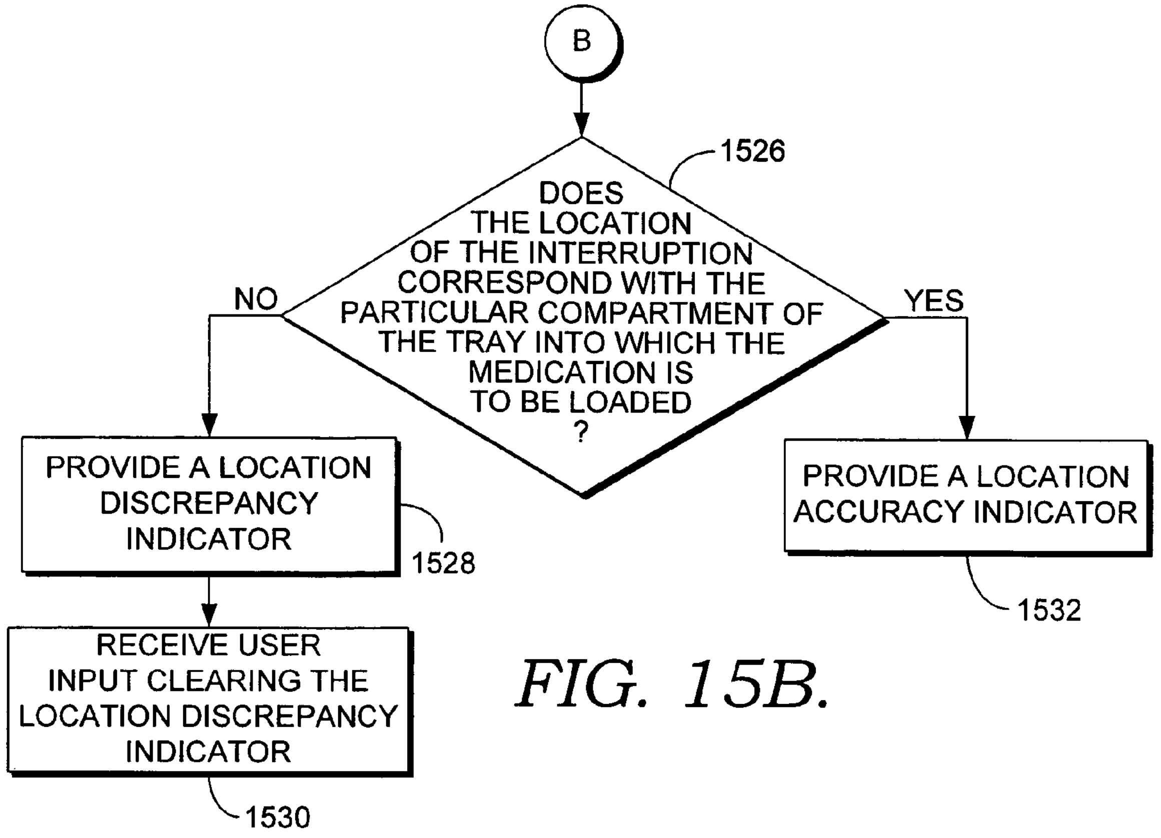

With reference to FIG. 15B, it is subsequently determined whether the location of the interruption corresponds with the particular compartment of the multi-compartment tray into which the medication is to be loaded, that is, the compartment output in the user instructions at block 1518 of FIG. 15A. If the location of the interruption does not correspond with the particular compartment of the tray output in the user instructions, the system provides a discrepancy indicator alerting the user that the medication has been improperly loaded. This is shown at block 1528. With reference to FIG. 9, a discrepancy indicator indicating an improperly loaded medication may be similar to discrepancy indicator 624 utilized to indicate improper loading in the example associated therewith.

In a currently preferred embodiment, the user must provide the system with some sort of input, for example, removing the improperly loaded medication through the improper location in the light grid and properly loading the medication through the proper location in the light grid, prior to the system prompting any further action. This is shown at block 1530.

If, on the other hand, the location of the interruption does correspond with the particular compartment of the multi-compartment tray output in the user instructions, the system provides an accuracy indicator informing the user that the medication has been properly loaded. This is shown at block 1532. With reference to FIG. 8, an accuracy indicator indicating a properly loaded medication may be similar to accuracy indicator 622 utilized to indicate proper loading in the example associated therewith.

Figure 15C:
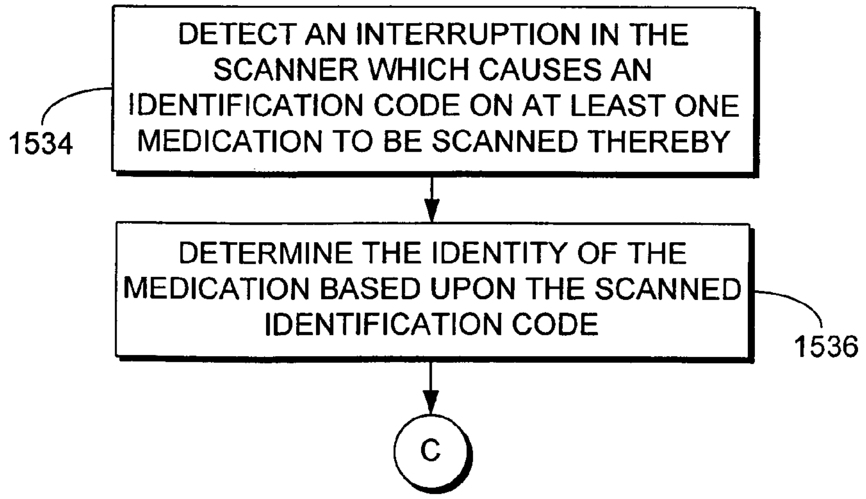

With reference to FIG. 15C, the system next detects an interruption in the scanner which causes an identification code on the at least on medication being removed from the multi-compartment tray to be scanned thereby, as indicated at block 1534. Subsequently, as shown at block 1536, the system determines the identity of the medication based upon the scanned identification code. It will be understood and appreciated by those of ordinary skill in the art that the detection of an interruption in the light grid (e.g., light grid 1404 of FIG. 14) and the detection of an interruption in the scanner (e.g., scanner 1406 of FIG. 14) likely occur simultaneously as both the light grid and the scanner are present over the top surface of the multi-compartment tray. As such, it will be understood that the order of the interruptions and subsequent corresponding processing steps illustrated in FIGS. 15A through 15D are not intended to limit the scope of the present invention in any way.

Figure 15D:
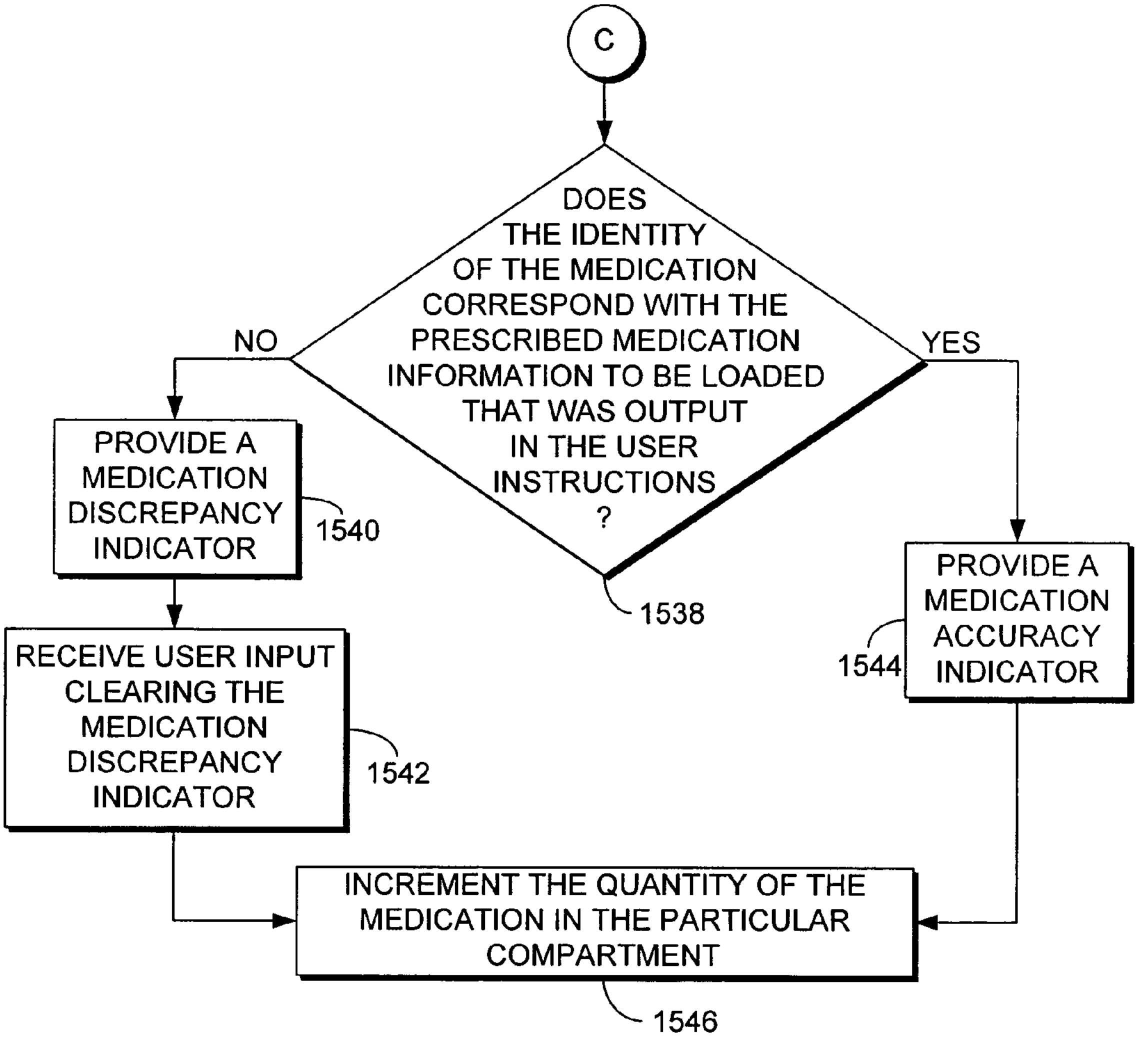

Turning to FIG. 15D, it is next determined whether the identity of the medication determined based upon the scanned identification code corresponds with the prescribed medication information to be loaded that was output in the user instructions at block 1518 of FIG. 15A. This is indicated at block 1538. If the identity of the medication does not correspond with the medication to be loaded that was output in the user instructions, the system provides a medication discrepancy indicator alerting the user that the medication has been improperly loaded. This is shown at block 1540. With reference to FIG. 9, a discrepancy indicator indicating an improperly loaded medication may be similar to discrepancy indicator 624 utilized to indicate improper loading in the example associated therewith. In a currently preferred embodiment, the user must provide the system with some sort of input, for example, removing the improperly loaded medication through the light grid and replacing it with the proper medication through the light grid, prior to the system prompting any further action. This is shown at block 1542.

If, on the other hand, the identity of the medication does correspond with the medication to be loaded that was output in the user instructions, the system provides a medication accuracy indicator informing the user that the medication has been properly loaded. This is shown at block 1544. With reference to FIG. 8, an accuracy indicator indicating a properly loaded medication may be similar to accuracy indicator 622 utilized to indicate proper loading in the example associated therewith.

Either upon receipt of user input clearing a discrepancy indicator or upon providing an accuracy indicator, the system increments the quantity of the medication loaded in the particular compartment, as indicated at block 1546. For instance, the quantity of medication may be incremented in a display area similar to the loaded medication display area 618 of FIG. 7.

Figure 16:
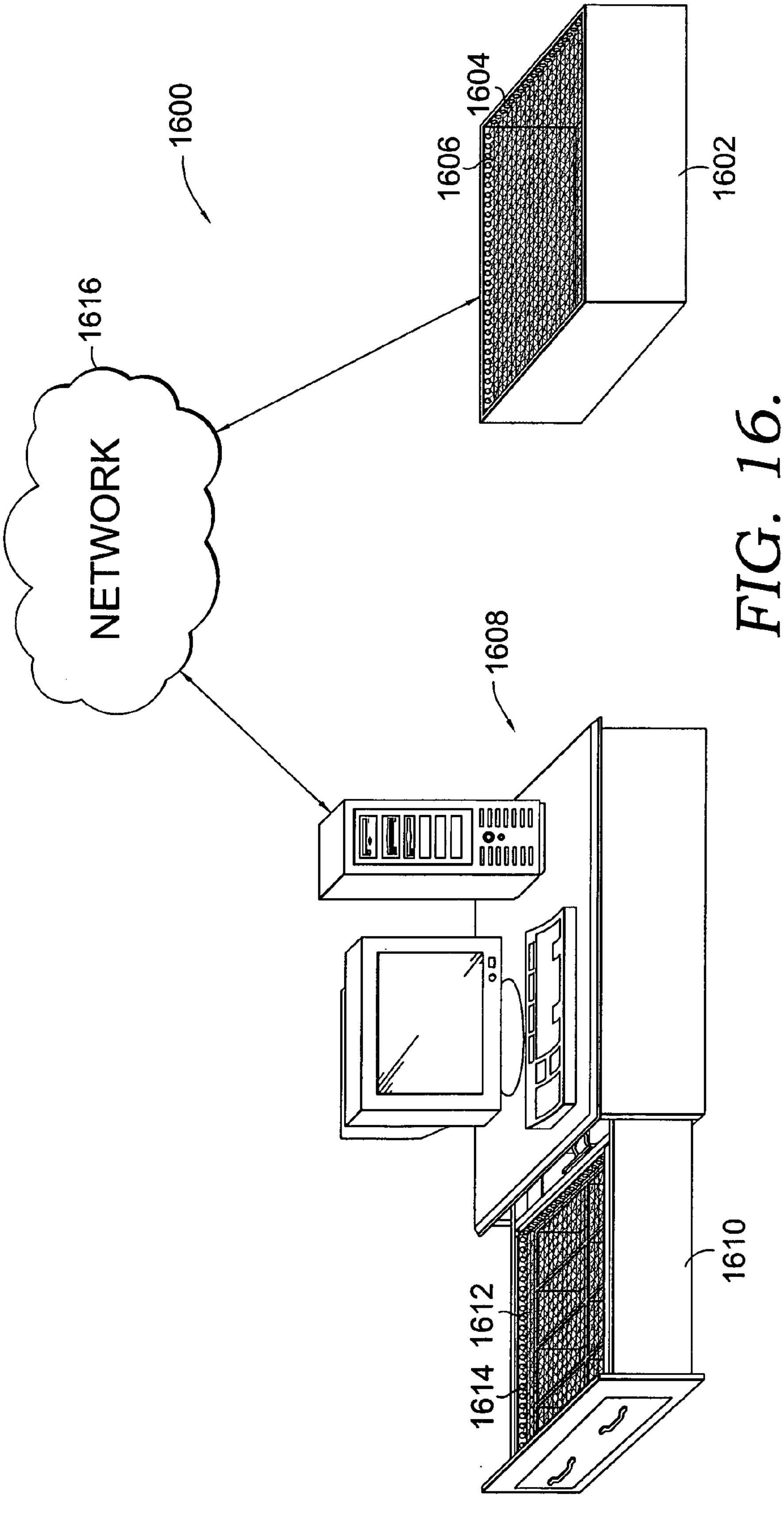
FIG. 16 is a diagram of a computing system configuration suitable for use in implementing an embodiment of the present invention wherein multiple light grids and multiple scanners are in communication with one another through a network.

In another embodiment, the present invention relates to a computerized method and system for loading medication from a medication supply container into a tray, each of the tray and the medication supply container having a light grid and a scanner over a respective top surface thereof. With reference to FIG. 16, an exemplary computing system configuration on which this embodiment of the present invention may be implemented is illustrated and designated generally as reference numeral 1600. By way of example only, the computing system configuration 1600 of FIG. 16 may be used by a pharmacist (or other authorized pharmacy personnel) to load a tray with medications specific to one or more patients from medication supply bins having particular medications in bulk quantities therein.

Computing system configuration 1600 includes a medication supply container 1602, e.g., a bulk medication supply bin, a medication loading and delivery unit 1608 (similar to the medication loading and delivery unit 100 of FIGS. 2 and 3), and a network 1616. The medication supply container 1602 includes a light grid 1604 (e.g., a light grid similar to light grid 1404 of FIG. 14) and a scanner 1606 (e.g., a scanner similar to scanner 1406 of FIG. 14) over a top surface thereof. The medication loading and delivery unit 1608 includes a tray-receiving component 1610 (e.g., a tray-receiving component similar to tray-receiving component 1402 of FIG. 14) having a multi-compartment tray received therein and light grid 1612 (e.g., a light grid similar to light grid 1404 of FIG. 14) and a scanner 1614 (e.g., a scanner similar to scanner 1406 of FIG. 14) over a top surface thereof. Light grids 1604 and 1612 communicate with one another through network 1616 such that it may be determined whether or not a quantity of medication removed from the medication supply container 1602 corresponds with a quantity of medication loaded in the tray received in the tray-receiving component 1610. Additionally, scanners 1606 and 1614 communicate with one another through network 1616 such that it may be determined whether the identity of a medication removed from the medication supply container 1602 corresponds with the identity of a medication loaded in the tray received in the tray-receiving component 1610, as more fully described below.

Figure 17:
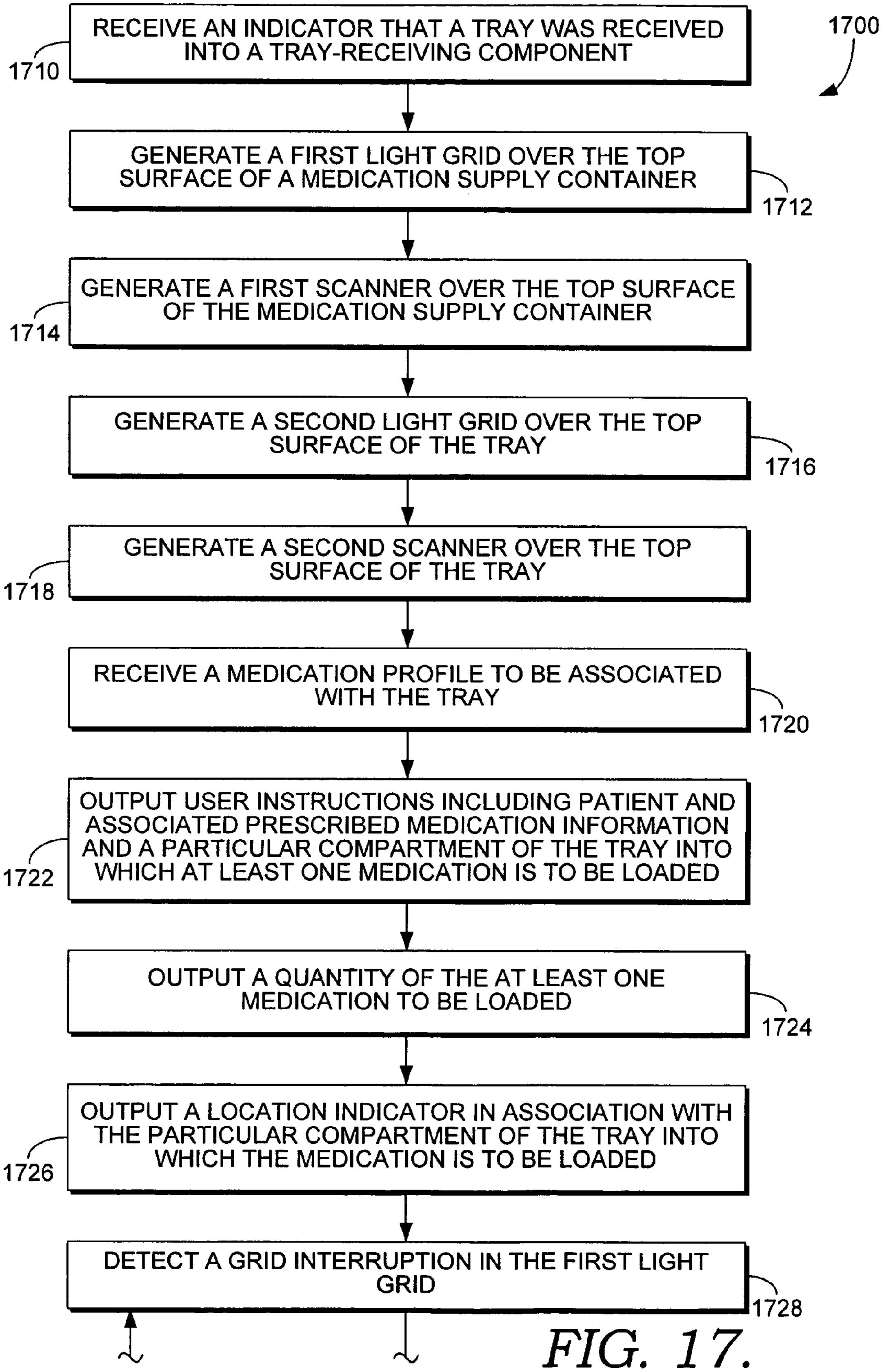
FIG. 17 is a flow chart representative of a computer program for loading a tray with medication from a medication supply container, each of the tray and the medication supply container having a light grid and a scanner over a respective top surface thereof, in accordance with an embodiment of the present invention.
Figure 17:
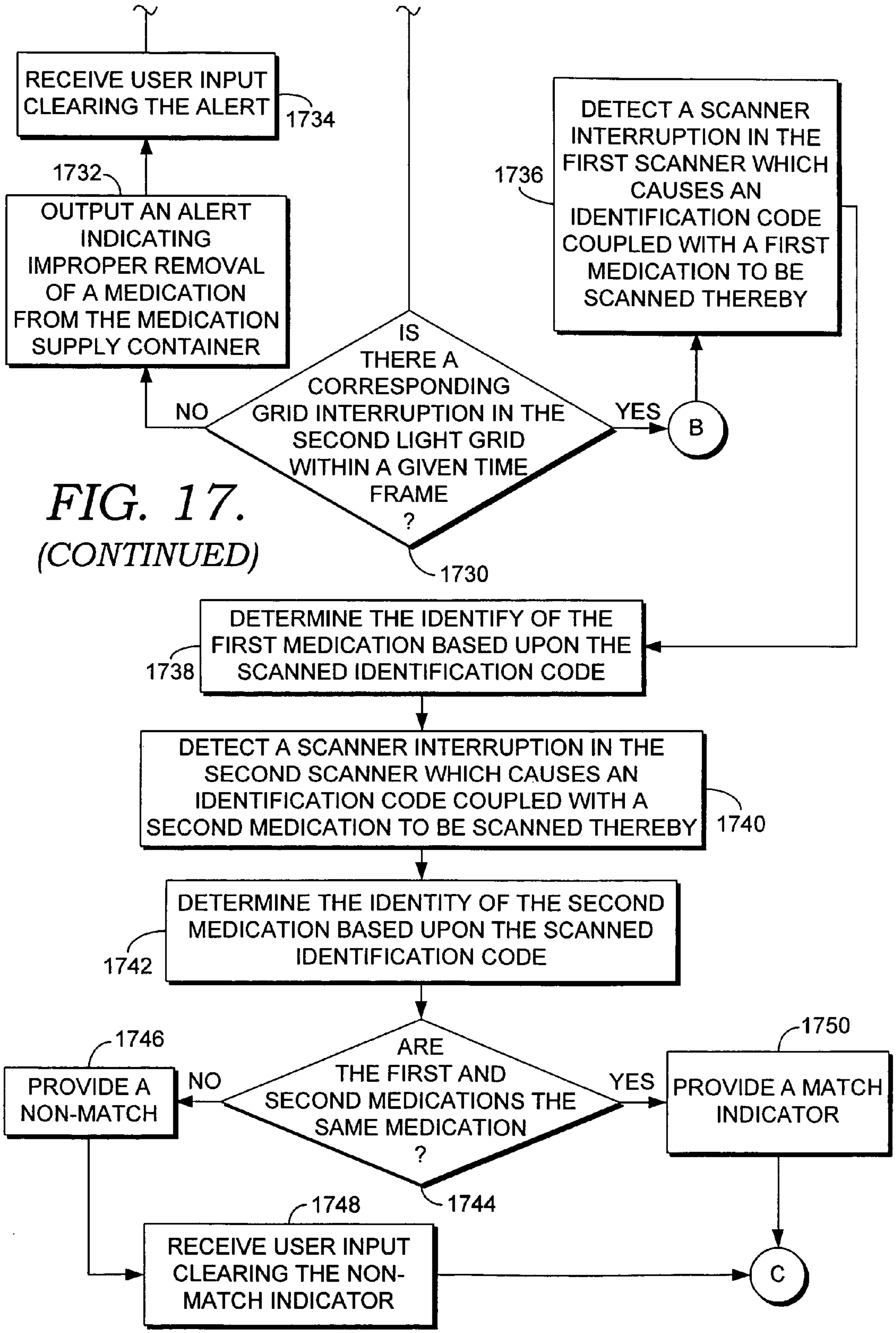

A method 1700 for loading medication from a medication supply container into a tray, each of the tray and the medication supply container having a light grid and a scanner over a respective top surface thereof, is shown in the flow diagram of FIG. 17. By way of example only, method 1700 may be used in a pharmacy setting where a pharmacist or other authorized individual may remove at least one medication from a bulk supply container and load it into a multi-compartment tray for delivery to one or more patients, as more fully described below.

Initially, as shown at block 1710, the system receives an indicator that a tray, for instance, the multi-compartment tray 110 of FIGS. 3 and 4, was received into a tray-receiving component, e.g., the tray-receiving component 1610 of FIG. 16. Subsequently, as shown at block 1712, a first light grid (e.g., light grid 1604 of FIG. 16) is generated over the top surface of a medication supply container (e.g., bulk medication supply bin 1602 of FIG. 16). Next, as shown at block 1714, a first scanner (e.g., scanner 1606 of FIG. 16) is generated over the top surface of the medication supply container. Subsequently, as shown at block 1716, a second light grid (e.g., light grid 1612 of FIG. 16) is generated over the top surface of the multi-compartment tray and, as shown at block 1718, a second scanner (e.g., scanner 1614 of FIG. 16) is generated over the top surface of the tray.

Next, as shown at block 1720, the system receives information, e.g., a medication profile, to be associated with the tray. As previously described, the medication profile may be accessed from a database upon the tray identification device (e.g., tray identification device 114 of FIG. 4B) being read by the medication and delivery unit 1608 of FIG. 16, or the medication profile may be stored in the tray identification device and retrieved therefrom. The medication profile may include, by way of example only, information identifying at least one individual for whom the medication to be loaded into the tray has been prescribed, an identity of the prescribed medication, and a dosage of the prescribed medication.

Subsequently, as shown at block 1722, user instructions are output which prompt the user to load the tray in accordance with the medication profile. As previously described, the user instructions may include, by way of example only, patient and associated prescribed medication information derived from the medication profile associated with the tray and a particular compartment of the tray into which a particular medication is to be loaded, if applicable. The system subsequently (or simultaneously) outputs a quantity of the at least one medication to be loaded, as indicated at block 1724. By way of example only, the user instructions may be output in a display area similar to the profile display area 606*a* of FIG. 7 and the quantity of medication to be loaded may be output in a display area similar to quantity display area 608*a* of FIG. 7.

Next, if desired, the system may output a location indicator in association with the particular compartment of the tray into which the medication is to be loaded, if applicable, as shown at block 1726. With reference to FIG. 7, a location indicator prompting loading of a medication may be similar to the location indicators 616 utilized for loading at least one medication in the example described in association therewith.

As the user begins the loading process, the system detects a grid interruption in the first light grid, as shown at block 1728. As interruptions in the first light grid are being detected, medications must be removed from the medication supply container (e.g., medication supply container 1602 of FIG. 16) individually. Subsequently, as shown at block 1730, the system determines whether a corresponding interruption is detected in the second light grid within a given time frame, e.g., ten seconds.

If there is a corresponding interruption detected in the second light grid, the method of the present invention proceeds in accordance with FIG. 15B. If there is not a corresponding interruption detected in the light grid within the given time frame, however, the system outputs an alert indicating to the user that a medication has been improperly removed from the medication supply container. This is indicated at block 1732. In a currently preferred embodiment, the user must provide the system with some sort of input, for example, replacing the improperly removed medication into the medication supply container, prior to the system prompting any further action. This is shown at block 1734.

Subsequently, the method of this embodiment of the present invention returns to block 1728 wherein a subsequent interruption in the first light grid is detected.

Upon detecting an interruption in the second light grid (e.g., light grid 1612 of FIG. 16) which corresponds with an interruption in the first light grid (e.g., light grid 1604 of FIG. 16) and completion of the steps indicated in FIG. 15B, the system detects a scanner interruption in the first scanner which causes an identification code coupled with the first medication to be scanned thereby. This is indicated at block 1736 of FIG. 17. Subsequently, as shown at block 1738, the system determines the identity of the first medication based upon the scanned identification code. It will be understood and appreciated by those of ordinary skill in the art that the detection of an interruption in the first light grid (e.g., light grid 1604 of FIG. 16) and the detection of an interruption in the first scanner (e.g., scanner 1606 of FIG. 16) likely occur simultaneously as both the first light grid and the first scanner are present over the top surface of the medication supply container (e.g., medication supply container 1602 of FIG. 16). As such, it will be understood that the order of the interruptions and subsequent corresponding processing steps illustrated in FIG. 17 are not intended to limit the scope of the present invention in any way.

Subsequently, as shown at block 1740, the system detects a scanner interruption in the second scanner (e.g., scanner 1614 of FIG. 16) which causes an identification code coupled with a second medication to be scanned thereby. Next, the identity of the second medication is determined based upon the scanned identification code, as indicated at block 1742. Again, it will be understood and appreciated by those of ordinary skill in the art that the detection of an interruption in the second light grid (e.g., light grid 1612 of FIG. 16) and the detection of an interruption in the second scanner (e.g., scanner 1614 of FIG. 16) likely occur simultaneously as both the second light grid and the second scanner are present over the top surface of the tray. As such, it will be understood that the order of the interruptions and subsequent corresponding processing steps illustrated in FIG. 17 are not intended to limit the scope of the present invention in any way.

As indicated at block 1744, it is next determined whether the first medication and the second medication are the same medication. If they are the same medication, the system provides a match indicator, as shown at block 1750. However, if the first and second medications are not the same medication, the system provides a non-match indicator alerting the user that a medication has been improperly loaded into the tray. This is indicated at block 1746. In a currently preferred embodiment, the user must provide the system with some sort of input, for example, removing the improperly loaded medication from the tray and replacing it with a medication having the proper identity, prior to the system prompting any further action. This is shown at block 1748.

Either upon receipt of user input clearing the non-match indicator or upon providing a match indicator, the method of this embodiment of the present invention proceeds in accordance with FIG. 15D.

Utilizing this method of the present invention, dual safety checks are implemented. First, the quantity of medications removed from one location must correspond with the quantity of medications placed in another location or a first alert is output. Second, the identity of a medication removed from one location must correspond with the identity of a medication placed in another location or a second alert is output. In this way, improper medication loading may be significantly minimized.

Figure 18:
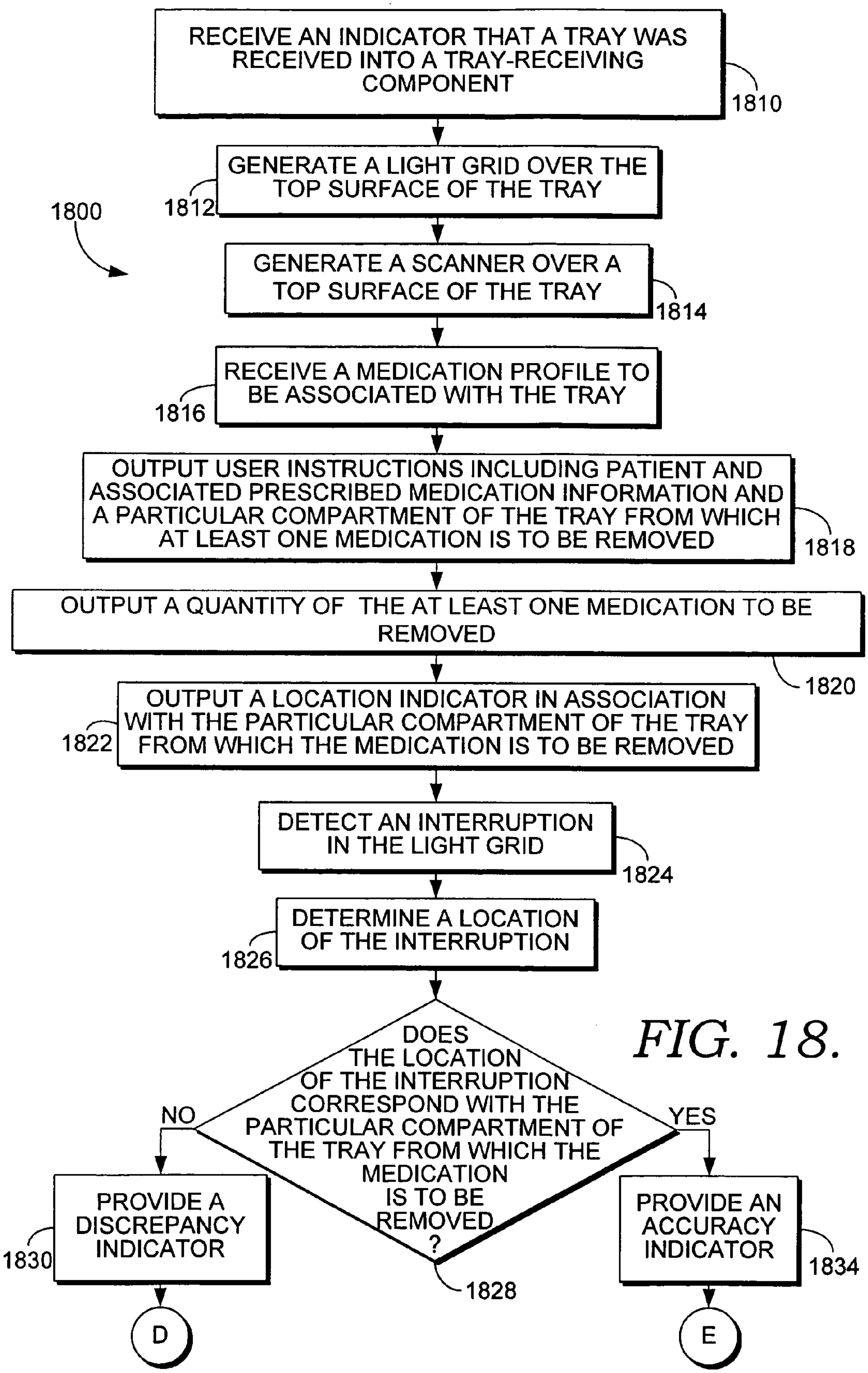
FIG. 18 is a flow chart representative of a computer program for delivering medication to at least one individual, the medication being removed from a tray having a light grid and a scanner over a top surface thereof, in accordance with an embodiment of the present invention.
Figure 18:
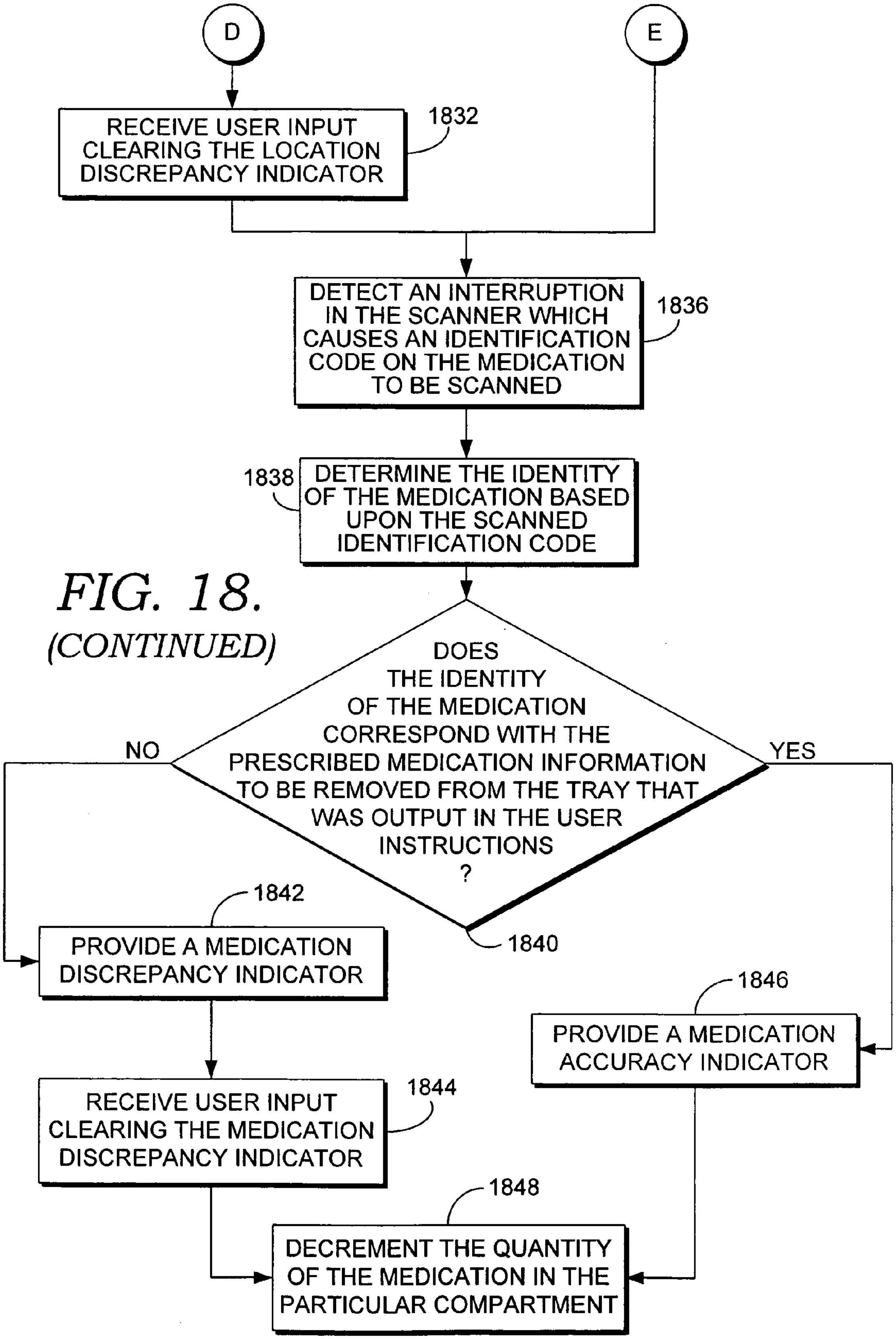

With reference to FIG. 18, a method in accordance with an embodiment of the present invention for delivering medication to at least one individual, the medication being removed from a tray having a light grid and a scanner over a top surface thereof, is illustrated and designated generally as method 1800. By way of example only, method 1800 may be used to deliver medications to a patient's bedside where a unit similar to the medication loading and delivery unit 1400 of FIG. 14 may be located.

Initially, as shown at block 1810, the system receives an indicator that a tray, for instance, the multi-compartment tray 110 of FIGS. 3 and 4, was received into a tray-receiving component, e.g., the tray-receiving component 1402 of FIG. 14. Subsequently, as shown at block 1812, a light grid is generated over the top surface of the tray (e.g., light grid 1404 of FIG. 14) such that when the light grid is interrupted, the location of the interruption and a corresponding location within the multi-compartment tray are capable of being determined. Next, a scanner (e.g., scanner 1406 of FIG. 14) is generated over the top surface of the tray such that when the scanner is interrupted by a medication having an identification code coupled therewith, the identity of the medication is capable of being determined. This is shown at block 1814.

Next, as shown at block 1816, the system receives information, e.g., a medication profile, to be associated with the tray. The medication profile may include, by way of example only, information identifying at least one or more individuals for whom the medication to be removed from the tray has been prescribed, an identity of the prescribed medication, and a dosage of the prescribed medication. Subsequently, user instructions are output which prompt the user to unload the tray in accordance with the medication profile, as indicated at block 1818. By way of example only, the user instruction may include patient and associated prescribed medication information and a particular compartment of the tray from which a particular medication is to be removed. The system subsequently (or simultaneously) outputs a quantity of the mediation to be removed, as indicated at block 1820. By way of example only, the user instructions may be output in a display area similar to the profile display area 606*a* of FIG. 7 and the quantity of medication to be loaded may be output in a display area similar to quantity display area 608*a* of FIG. 7.

Next, if desired, the system may output a location indicator in association with the particular compartment of the tray from which the medication is to be removed, as indicated at block 1822. With reference to FIG. 7, a location indicator prompting removal of the medication may be similar to the location indicators 616 utilized for loading at least one medication in the example described in association therewith.

Referring back to FIG. 18, as the user begins to remove the indicated medication from the tray, the system detects an interruption in the light grid, as shown at block 1824. Subsequently, as shown at block 1826, the system determines the location of the interruption in the light grid. As will be understood by those of ordinary skill in the art, since the system detects interruptions in the light grid, medications must be removed from the tray individually.

Next, as indicated at block 1828, it is determined whether the location of the interruption corresponds with the particular compartment of the multi-compartment tray from which the medication is to be removed, that is, the compartment output in the user instructions at block 1818. If the location of the interruption does not correspond with the particular compartment of the tray output in the user instructions, the system provides a discrepancy indicator alerting the user that the medication has been improperly removed, as indicated at block 1830. With reference to FIG. 9, a discrepancy indicator indicating an improperly removed medication may be similar to discrepancy indicator 624 utilized to indicate improper loading in the example associated therewith. In a currently preferred embodiment, the user must provide the system with some sort of input, for example, replacing the improperly removed medication through the proper location in the light grid, prior to the system prompting any further action. This is shown at block 1832.

If, on the other hand, the location of the interruption does correspond with the particular compartment of the multi-compartment tray output in the user instructions, the system provides an accuracy indicator informing the user that the medication has been properly removed. This is shown at block 1834. With reference to FIG. 8, an accuracy indicator indicating a properly removed medication may be similar to accuracy indicator 622 utilized to indicate proper loading in the example associated therewith.

Either upon receipt of user input clearing the discrepancy indicator or upon providing an accuracy indicator, the system detects an interruption in the scanner which causes an identification code coupled with the medication (e.g., a bar code on the packaging of an individually-wrapped medication) to be scanned thereby. This is indicated at block 1836. Subsequently, as shown at block 1838, the system determines the identity of the medication based upon the scanned identification code. It will be understood and appreciated by those of ordinary skill in the art that the detection of an interruption in the light grid (e.g., light grid 1404 of FIG. 14) and the detection of an interruption the scanner (e.g., scanner 1406 of FIG. 14) likely occur simultaneously as both the light grid and the scanner are present over the top surface of the tray (e.g., multi-compartment tray 110 of FIGS. 3 and 4). As such, it will be understood that the order of the interruptions and subsequent corresponding method steps illustrated in FIG. 18 are not intended to limit the scope of the invention in any way.

Subsequently, as shown at block 1840, the system determines whether the identity of the medication determined based upon the scanned identification code corresponds with the prescribed medication information to be loaded that was output in the user instructions at block 1818. If the identity of the medication does not correspond with the medication to be loaded that was output in the user instructions, the system provides a medication discrepancy indicator alerting the user that the medication has been improperly removed. This is shown at block 1844. In a currently preferred embodiment, the user must provide the system with some sort of input, for example, replacing the improperly removed medication through the light grid and the scanner, prior to the system prompting any further action. This is shown/at block 1844. If, on the other hand, the identity of the medication does correspond with the medication to be removed that was output in the user instructions, the system provides a medication accuracy indicator informing the user that the medication has been properly removed. This is shown at block 1846.

Either upon receipt of user input clearing a discrepancy indicator or upon providing an accuracy indicator, the system decrements the quantity of the medication loaded in the particular compartment, as indicated at block 1848. For instance, the quantity of medication may be decremented in a display area similar to the loaded medication display area 618 of FIG. 7.

In summary, the present invention provides a computerized method and system for loading a tray, e.g., a multi-compartment tray, with at least one medication, the multi-compartment tray having a light grid over a top surface thereof. The present invention further provides a computerized method and system for delivering medication to at least one individual from a tray having a light grid over a top surface thereof. If desired, the tray may further include a scanner over a top surface thereof which is capable of scanning an identification code coupled with the medication being loaded and/or removed from the tray.

Although the invention has been described with reference to the preferred embodiments illustrated in the attached drawing figures, it is noted that substitutions may be made and equivalents employed herein without departing from the scope of the invention recited in the claims. For instance, additional steps may be added and steps may be omitted without departing from the scope of the invention.

The invention claimed is:

1. A method in a computing environment, the method comprising:

providing a tray having an upper perimeter and a light grid and scanner located in the upper perimeter;

receiving an indicator that at least one medication is loaded into the tray, the tray having at least one compartment and the at least one medication having an identification code coupled therewith which is capable of being scanned;

determining a particular compartment of the tray into which the at least one medication is loaded; and determining an identity of the at least one medication based upon the identification code coupled therewith.

2. The method of claim 1, wherein receiving the indicator that the at least one medication is loaded into the tray comprises detecting an interruption in the light grid.

3. The method of claim 2, wherein determining the particular compartment of the tray into which the at least one medication is loaded comprises determining a location of the interruption and a corresponding location within the tray.

4. The method of claim 1, wherein determining an identity of the at least one medication based upon the identification code coupled therewith comprises:

detecting an interruption in the scanner which causes the identification code coupled with the at least one medication to be scanned thereby; and determining the identity of the at least one medication based upon the scanned identification code.

5. The method of claim 1, further comprising receiving a medication profile to be associated with the tray, the medication profile comprising information identifying at least one of one or more individuals for whom the at least one medication was prescribed, an identity of the at least one medication, and a dosage of the at least one medication.

6. The method of claim 1, further comprising receiving a medication profile to be associated with the tray, the medication profile comprising information identifying at least one of one or more types of individuals for whom the at least one medication is likely to be prescribed, an identity of the at least one medication, and a dosage of the at least one medication.

7. The method of claim 1, further comprising outputting user instructions including at least one of one or more individuals for whom the at least one medication was prescribed, an identity of the at least one medication, and a particular compartment of the tray into which the at least one medication is to be loaded.

8. The method of claim 7, further comprising outputting a quantity of the at least one medication to be loaded into the particular compartment.

9. The method of claim 8, further comprising outputting at least one of a visual location indicator and an audio location indicator in association with the particular compartment of the tray into which the at least one medication is to be loaded.

10. The method of claim 9, further comprising outputting a quantity of the at least one medication in the particular compartment.

11. The method of claim 7, wherein if the particular compartment of the tray into which the at least one medication is loaded is determined to be a compartment other than the particular compartment into which the at least one medication is to be loaded output in the user instructions, the method further comprises providing at least one of a visual location discrepancy indicator and an audio location discrepancy indicator.

12. The method of claim 10, wherein if the particular compartment of the tray into which the at least one medication is loaded is determined to be the particular compartment into which the at least one medication is to be loaded output in the user instructions, the method further comprises providing at least one of a visual location accuracy indicator and an audio location accuracy indicator.

13. The method of claim 12, wherein upon providing the at least one of the visual location accuracy indicator and the audio location accuracy indicator, the quantity of the at least one medication in the particular compartment output with the user instructions is incremented.

14. The method of claim 7, wherein if the identity of the at least one medication is determined to be other than the identity of the at least one medication output in the user instructions, the method further comprises providing at least one of a visual medication discrepancy indicator and an audio medication discrepancy indicator.

15. The method of claim 7, wherein if the identity of the at least one medication is determined to be the identity of the at least one medication output in the user instructions, the method further comprises providing at least one of a visual medication accuracy indicator and an audio medication accuracy indicator.

16. The method of claim 1, wherein receiving the indicator that the at least one medication is loaded into the tray comprises receiving a plurality of indicators, each associated with a single one of the at least one medication, wherein each single one of the at least one medication is loaded into the tray individually.

17. The method of claim 1, wherein the tray includes a tray identification device coupled therewith.

18. The method of claim 17, wherein the tray identification device comprises a bar code.

19. The method of claim 5, wherein the tray includes a tray identification device coupled therewith.

20. The method of claim 19, wherein the tray identification device is capable of having information comprising at least one of the medication profile associated with the tray, any medications in the tray, and into which compartments of the tray any medications are loaded, stored therein and retrieved therefrom.

21. The method of claim 20, wherein the tray identification device comprises a radio frequency identification device.

22. The method of claim 1, further comprising:

receiving an indicator that the tray is received into a tray-receiving component;

generating the light grid over the surface of the tray such that when the light grid is interrupted, a location of such interruption and a corresponding location within the tray are capable of being determined; and generating the scanner over a surface of the tray such that when the scanner is interrupted by the at least one medication having an identification code coupled therewith which is capable of being scanned, an identity of the at least one medication is capable of being determined.

23. The method of claim 22, wherein the tray-receiving component comprises a drawer.

24. A method in a computing environment, comprising:

providing a medication supply container having an upper perimeter and a first light grid and a first scanner located in the upper perimeter;

providing a tray having an upper perimeter and a second light grid and a second scanner located in the upper perimeter, the first and second light grids and the first and second scanners being in communication with one another through a network;

receiving an indicator that a first medication is removed from the medication supply container, the first medication having an identification code coupled therewith which is capable of being scanned;

determining an identity of the first medication based upon the identification code coupled therewith;

receiving an indicator that a second medication is loaded into the tray, the tray having at least one compartment, the second medication having an identification code coupled therewith which is capable of being scanned;

determining an identity of the second medication based upon the identification code coupled therewith;

determining whether the first medication and the second medication are the same medication; and determining a particular compartment of the tray into which the second medication is loaded.

25. The method of claim 24, wherein receiving the indicator that the first medication is removed from the medication supply container comprises detecting an interruption in the first light grid.

26. The method of claim 24, wherein determining the identity of the first medication based upon the identification code coupled therewith comprises:

detecting an interruption in the first scanner which causes the identification code coupled with the first medication to be scanned thereby; and determining the identity of the first medication based upon the scanned identification code.

27. The method of claim 26, wherein receiving the indicator that the second medication is loaded into the tray comprises detecting an interruption in the second light grid.

28. The method of claim 27, wherein determining a particular compartment of the tray into which the second medication is loaded comprises determining a location of the interruption and a corresponding location within the tray.

29. The method of claim 26, wherein determining the identity of the second medication based upon the identification code coupled therewith comprises:

detecting an interruption in the second scanner which causes the identification code coupled with the second medication to be scanned thereby; and determining the identity of the second medication based upon the scanned identification code.

30. The method of claim 29, wherein determining whether the first medication and the second medication are the same medication comprises comparing the scanned identification code of the first medication with the scanned identification code of the second medication.

31. The method of claim 30, wherein if the first medication and the second medication are the same medication, the method further comprises providing at least one of visual match indicator and an audio match indicator.

32. The method of claim 30, wherein if the first medication and the second medication are not the same medication, the method further comprises providing at least one of a visual non-match indicator and an audio non-match indicator.

33. A method in a computing environment, comprising:

providing a tray having an upper perimeter and a light grid and scanner located in the upper perimeter;

receiving an indicator that the at least one medication is removed from the tray, the tray having at least one compartment and the at least one medication having an identification code coupled therewith which is capable of being scanned;

determining a particular compartment of the tray from which the at least one medication is removed; and determining an identity of the at least one medication based upon the identification code coupled therewith.

34. The method of claim 33, wherein receiving an indicator that the at least one medication is removed from the tray comprises detecting an interruption in the light grid.

35. The method of claim 34, wherein determining the particular compartment of the tray from which the at least one medication is removed comprises determining a location of the interruption and a corresponding location within the tray.

36. The method of claim 33, wherein determining the identity of the at least one medication based upon the identification code coupled therewith comprises:

detecting an interruption in the scanner which causes the identification code coupled with the at least one medication to be scanned; and determining the identity of the at least one medication based upon the scanned identification code.

37. The method of claim 33, further comprising receiving a medication profile associated with the tray, the medication profile comprising information identifying at least one of one or more individuals for whom the at least one medication was prescribed, an identity of the at least one medication, and a dosage of the at least one medication.

38. The method of claim 33, further comprising receiving a medication profile associated with the tray, the medication profile comprising information identifying at least one of one or more types of individuals for whom the at least one medication is likely to be prescribed, an identity of the at least one medication, and a dosage of the at least one medication.

39. The method of claim 33, further comprising outputting user instructions including at least one of one or more individuals for whom the at least one medication was prescribed, an identity of the at least one medication, and a particular compartment of the tray from which the at least one medication is to be removed.

40. The method of claim 39, further comprising outputting a quantity of the at least one medication to be removed from the particular compartment.

41. The method of claim 40, further comprising outputting at least one of a visual location indicator and an audio location indicator in association with the particular compartment of the tray from which the at least one medication is to be removed.

42. The method of claim 41, further comprising outputting a quantity of the at least one medication in the particular compartment.

43. The method of claim 39, wherein if the particular compartment of the tray from which the at least one medication is removed is determined to be a compartment other than the particular compartment from which the at least one medication is to be removed output in the user instructions, the method further comprises providing at least one of a visual location discrepancy indicator and an audio location discrepancy indicator.

44. The method of claim 42, wherein if the particular compartment of the tray from which the at least one medication is removed is determined to be the particular compartment from which the at least one medication is to be removed output in the user instructions, the method further comprises providing at least one of a visual location accuracy indicator and an audio location accuracy indicator.

45. The method of claim 44, wherein upon providing the at least one of the visual location accuracy indicator and the audio location accuracy indicator, the quantity of the at least one medication in the particular compartment output with the user instructions is decremented.

46. The method of claim 39, wherein if the identity of the at least one medication is determined to be other than the identity of the at least one medication output in the user instructions, the method further comprises providing at least one of a visual medication discrepancy indicator and an audio medication discrepancy indicator.

47. The method of claim 39, wherein if the identity of the at least one medication is determined to be the identity of the at least one medication output in the user instructions, the method further comprises providing at least one of a visual medication accuracy indicator and an audio medication accuracy indicator.

48. The method of claim 33, wherein receiving the indicator that the at least one medication is removed from the tray comprises receiving a plurality of indicators, each associated with a single one of the at least one medication, wherein each single one of the at least one medication is removed from the tray individually.

49. The method of claim 33, wherein the tray includes a tray identification device coupled therewith.

50. The method of claim 49, wherein the tray identification device comprises a bar code.

51. The method of claim 37, wherein the tray includes a tray identification device coupled therewith.

52. The method of claim 51, wherein the tray identification device is capable of having information comprising at least one of the medication profile associated with the tray, any medications in the tray, and into which compartments of the tray any medications are loaded, stored therein and retrieved therefrom.

53. The method of claim 52, wherein the tray identification device comprises a radio frequency identification device.

54. The method of claim 33, further comprising:

receiving an indicator that the tray is received into a tray-receiving component;

generating the light grid over the surface of the tray such that when the light grid is interrupted, a location of such interruption and a corresponding location within the tray are capable of being determined; and generating the scanner over the surface of the tray such that when the scanner is interrupted by the at least one medication having an identification code coupled therewith which is capable of being scanned, an identification of the at least one medication is capable of being determined.

55. A computer system, comprising:

a providing module for providing a tray having a light grid and a scanner over a surface thereof;

an indicator receiving module for receiving an indicator that at least one medication is loaded into the tray, the tray having at least one compartment and the at least one medication having an identification code coupled therewith which is capable of being scanned;

a location determining module for determining a particular compartment of the tray into which the at least one medication is loaded; and an identity determining module for determining an identity of the at least one medication based upon the identification code coupled therewith.

56. The computer system of claim 55, wherein the indicator receiving module includes a detecting module for detecting an interruption in the light grid.

57. The computer system of claim 56, wherein the location determining module is capable of determining a location of the interruption and a corresponding location within the tray.

58. The computer system of claim 55, wherein the identity determining module includes a detecting module for detecting an interruption in the scanner which causes the identification code coupled with the at least one medication to be scanned thereby, and wherein the identity determining module is capable of determining the identity of the at least one medication based upon the scanned identification code.

59. The computer system of claim 55, further comprising a medication profile receiving module for receiving a medication profile to be associated with the tray, the medication profile comprising information identifying at least one of one or more individuals for whom the at least one medication is prescribed, an identity of the at least one medication, and a dosage of the at least one medication.

60. The computer system of claim 51, further comprising a user instruction outputting module for outputting user instructions including at least one of one or more individuals for whom the at least one medication is prescribed, an identity of the at least one medication, and a particular compartment of the tray into which the at least one medication is to be loaded.

61. The computer system of claim 60, further comprising a first quantity outputting module for outputting a quantity of the at least one medication to be loaded into the particular compartment.

62. The computer system of claim 61, further comprising an output indicator module for outputting at least one of a visual location indicator and an audio location indicator in association with the particular compartment of the tray into which the at least one medication is to be loaded.

63. The computer system of claim 62, further comprising a second quantity outputting module for outputting a quantity of the at least one medication in the particular compartment.

64. The computer system of claim 60, further comprising a location discrepancy indicator module for providing at least one of a visual location discrepancy indicator and an audio location discrepancy indicator if the particular compartment of the tray into which the at least one medication is loaded is other than the particular compartment into which the at least one medication is to be loaded output from the user instruction outputting module.

65. The computer system of claim 63, further comprising a location accuracy indicator module for providing at least one of a visual location accuracy indicator and an audio location accuracy indicator if the particular compartment of the tray into which the at least one medication is loaded is the particular compartment into which the at least one medication is to be loaded output from the user instruction outputting module.

66. The computer system of claim 65, further comprising an incrementing module for incrementing a quantity of medications in the particular compartment output from the user instruction outputting module upon providing the at least one of the visual location accuracy indicator and the audio location accuracy indicator.

67. The computer system of claim 60, further comprising a medication discrepancy indicator module for providing at least one of a visual medication discrepancy indicator and an audio medication discrepancy indicator if the identity of the at least one medication is determined to be other than the identity of the at least one medication output from the user instruction outputting module.

68. The computer system of claim 60, further comprising a medication accuracy indicator module for providing at least one of a visual medication accuracy indicator and an audio medication accuracy indicator if the identity of the at least one medication is determined to be the identity of the at least one medication output from the user instruction outputting module.

69. The computer system of claim 59, further comprising a storage and retrieval module for storing and retrieving information comprising at least one of the medication profile associated with the tray, any medication in the tray, and into which compartments of the tray any medications are loaded, from a tray identification device associated with the tray.

70. The computer system of claim 55, further comprising:

a tray receipt indicator module for receiving an indicator that the tray is received into a tray-receiving component;

a light grid generating module for generating the light grid over the surface of the tray such that when the light grid is interrupted, a location of such interruption and a corresponding location within the tray are capable of being determined; and a scanner generating module for generating the scanner over the surface of the tray such that when the scanner is interrupted by the at least one medication having an identification code coupled therewith which is capable of being scanned, an identification of the at least one medication is capable of being determined.

71. A computer system, comprising:

a first providing module for providing a medication supply container having a first light grid and a first scanner over a surface thereof;

a second providing module for providing a tray having a second light grid and a second scanner over a surface thereof, the first and second light grids and the first and second scanners being in communication with one another through a network;

a first indicator receiving module for receiving an indicator that a first medication is removed from the medication supply container, the first medication having an identification code coupled therewith which is capable of being scanned;

a first identity determining module for determining an identity of the first medication based upon the identification code coupled therewith;

a second indicator receiving module for receiving an indicator that a second medication is loaded into the tray, the tray having at least one compartment and the second medication having an identification code coupled therewith which is capable of being scanned;

a second identity determining module for determining an identity of the second medication based upon the identification code coupled therewith;

a comparison module for determining whether the first medication and the second medication are the same medication; and a location determining module for determining into which compartment of the tray the second medication is loaded.

72. The computer system of claim 71, wherein the first indicator receiving module includes a detection module for detecting an interruption in the first light grid.

73. The computer system of claim 71, wherein the first identity determining module includes:

a detection module for detecting an interruption in the first scanner which causes the identification code coupled with the first medication to be scanned thereby; and a medication determining module for determining the identity of the first medication based upon the scanned identification code.

74. The computer system of claim 71, wherein the second indicator receiving module includes a detection module for detecting an interruption in the second light grid.

75. The computer system of claim 74, wherein the location determining module is capable of determining a location of the interruption and a corresponding location within the tray.

76. The computer system of claim 71, wherein the second identity determining module includes:

a detection module for detecting an interruption in the second scanner which causes the identification coupled with the second medication to be scanned thereby; and a medication determining module for determining the identity of the second medication based upon the scanned identification code.

77. A computer system, comprising:

a providing module for providing a tray having a light grid and a scanner over a surface thereof;

an indicator receiving module for receiving an indicator that at least one medication is removed from the tray, the tray having at least one compartment and the at least one medication having an identification code coupled therewith which is capable of being scanned;

a location determining module for determining a particular compartment of the tray from which the at least one medication is removed; and an identity determining module for determining an identity of the at least one medication based upon the identification code coupled therewith.

78. The method of claim 77, wherein the indicator receiving module includes a detecting module for detecting an interruption in the light grid.

79. The computer system of claim 78, wherein the location determining module is capable of determining a location of the interruption and a corresponding location within the tray.

80. The computer system of claim 77, wherein the identity determining module includes a detecting module for detecting an interruption in the scanner which causes the identification code coupled with the at least one medication to be scanned thereby, and wherein the identity determining module is capable of determining the identity of the at least one medication based upon the scanned identification code.

81. The computer system of claim 77, further comprising a medication profile receiving module for receiving a medication profile associated with the tray, the medication profile comprising information identifying at least one of one or more individuals for whom the at least one medication is prescribed, an identity of the at least one medication, and a dosage of the at least one medication.

82. The computer system of claim 77, further comprising a user instruction outputting module for outputting user instructions including at least one of one or more individuals for whom the at least one medication is prescribed, an identity of the at least one medication, and a particular compartment of the tray from which the at least one medication is to be removed.

83. The computer system of claim 82, further comprising a first outputting module for outputting a quantity of the at least one medication to be removed from the particular compartment.

84. The computer system of claim 82, further comprising an output indicator module for outputting at least one of a visual location indicator and an audio location indicator in association with the particular compartment of the tray from which the at least one medication is to be removed.

85. The computer system of claim 84, further comprising a second outputting module for outputting a quantity of the at least one medication in the particular compartment.

86. The computer system of claim 82, further comprising a location discrepancy indicator module for providing at least one of a visual location discrepancy indicator and an audio location discrepancy indicator if the particular compartment of the tray from which the at least one medication is removed is other than the particular compartment from which the at least one medication is to be removed output from the user instruction outputting module.

87. The computer system of claim 85, further comprising a location accuracy indicator module for providing at least one of a visual location accuracy indicator and an audio location accuracy indicator if the particular compartment of the tray from which the at least one medication is removed is the particular compartment from which the at least one medication is to be removed output from the user instruction outputting module.

88. The computer system of claim 87, further comprising a decrementing module for decrementing the quantity of the at least one medication in the particular compartment output from the user outputting module upon providing the at least one of the visual location accuracy indicator and the audio location accuracy indicator.

89. The computer system of claim 82, further comprising a medication discrepancy indicator module for providing at least one of a visual medication discrepancy indicator and an audio medication discrepancy indicator if the identity of the at least one medication removed from the tray is determined to be other than the identity of the at least one medication output from the user instruction outputting module.

90. The computer system of claim 82, further comprising a medication accuracy indicator module for providing at least one of a visual medication accuracy indicator and an audio medication accuracy indicator if the identity of the at least one medication removed from the tray is determined to be the identity of the at least one medication output from the user instruction outputting module.

91. The computer system of claim 81, further comprising a storage and retrieval module for storing and retrieving information comprising at least one of the medication profile associated with the tray, any medication in the tray, and into which compartments of the tray any medications are loaded, from a tray identification device associated with the tray.

92. The computer system of claim 77, further comprising:

a tray receipt indicator module for receiving an indicator that the tray is received into a tray-receiving component;

a light grid generating module for generating the light grid over the surface of the tray such that when the light grid is interrupted, a location of such interruption and a corresponding location within the tray are capable of being determined; and a scanner generating module for generating the scanner over the surface of the tray such that when the scanner is interrupted by the at least one medication having an identification code coupled therewith which is capable of being scanned, an identification of the at least one medication is capable of being determined.

93. A computer-readable medium having computer-executable instructions for performing a method, the method comprising:

receiving an indicator that at least one medication having an identification code coupled therewith which is capable of being scanned is loaded into a tray, the tray having at least one compartment and a light grid and a scanner over a surface thereof;

detecting an interruption in the light grid;

determining a particular compartment of the tray into which the at least one medication is loaded based upon a location of the interruption and a corresponding location within the tray;

detecting an interruption in the scanner which causes the identification code coupled with the at least one medication to be scanned thereby; and determining an identity of the at least one medication based upon the scanned identification code.

94. A computer-readable medium having computer-executable instructions for performing a method, the method comprising:

receiving an indicator that a first medication having an identification code coupled therewith that is capable of being scanned is removed from a medication supply container, the medication supply container having a first light grid and a first scanner over a surface thereof;

detecting an interruption in the first scanner which causes the identification code coupled with the first medication to be scanned thereby;

determining an identity of the first medication based upon the scanned identification code;

receiving an indicator that a second medication having an identification code coupled therewith that is capable of being scanned is loaded into the tray, the tray having at least one compartment and a second light grid and a second scanner over a surface thereof;

detecting an interruption in the second scanner which causes the identification code coupled with the second medication to be scanned thereby;

determining an identity of the second medication based upon the scanned identification code;

determining whether the first medication and the second medication are the same medication;

detecting an interruption in the second light grid; and determining a particular compartment of the tray into which the second medication is loaded based upon a location of the interruption and a corresponding location within the tray.

95. A computer-readable medium having computer-executable instructions for performing a method, the method comprising:

receiving an indicator that at least one medication having an identification code coupled therewith that is capable of being scanned is removed from a tray, the tray having at least one compartment and a light grid and a scanner over a surface thereof;

detecting an interruption in the light grid;

determining a particular compartment of the tray from which the at least one medication is removed based upon a location of the interruption, and a corresponding location within the tray;

detecting an interruption in the scanner which causes the identification code coupled with the at least one medication to be scanned; and determining the identity of the at least one medication based upon the scanned identification code.

* * * * *